(12) United States Patent
Ollivier et al.

(10) Patent No.: US 6,738,881 B1
(45) Date of Patent: May 18, 2004

(54) MULTI-CHANNEL DMA WITH SCHEDULED PORTS

(75) Inventors: Gerald Ollivier, Vence (FR); Armelle Laine, Antibes (FR); Daniel Mazzocco, Le Rouret (FR); Laurent Six, Bar sur Loup (FR)

(73) Assignee: Texas Instruments Incorporated, Dallas, TX (US)

( * ) Notice: Subject to any disclaimer, the term of this patent is extended or adjusted under 35 U.S.C. 154(b) by 649 days.

(21) Appl. No.: 09/591,076

(22) Filed: Jun. 9, 2000

(30) Foreign Application Priority Data

Jun. 9, 1999 (EP) ............................................ 99401389

(51) Int. Cl.[7] ............................................. G06F 12/06
(52) U.S. Cl. ..................... 711/168; 711/154; 710/38; 710/20; 370/329
(58) Field of Search ..................... 709/202; 370/228, 370/329, 254, 248; 710/100, 20, 26, 35, 36, 21, 22, 107, 111, 38, 112, 240; 711/147, 168, 150, 151, 169, 5, 154

(56) References Cited

U.S. PATENT DOCUMENTS

| | | | | |
|---|---|---|---|---|
| 5,528,584 A | * | 6/1996 | Grant et al. | 370/254 |
| 5,546,547 A | | 8/1996 | Bowes et al. | 395/294 |
| 5,890,013 A | | 3/1999 | Nair et al. | 395/873 |
| 6,076,139 A | * | 6/2000 | Welker et al. | 711/104 |
| 6,125,421 A | * | 9/2000 | Roy | 711/5 |
| 6,141,376 A | * | 10/2000 | Shaw | 375/222 |
| 6,279,057 B1 | * | 8/2001 | Westby | 710/52 |
| 6,477,174 B1 | * | 11/2002 | Dooley et al. | 370/416 |

FOREIGN PATENT DOCUMENTS

| | | | | |
|---|---|---|---|---|
| EP | 0 486 145 A2 | 10/1991 | | G06F/13/28 |
| JP | 11003310 | 6/1997 | | G06F/13/28 |

\* cited by examiner

*Primary Examiner*—Pierre-Michel Bataille
(74) *Attorney, Agent, or Firm*—Robert D. Marshall, Jr.; W. James Brady, III; Frederick J. Telecky, Jr.

(57) ABSTRACT

A digital system is provided with a multi-channel DMA controller (400) for transferring data between various resources (401, 402). Each channel includes a source port (460–461), a channel controller (410–412) and a destination port (460, 461). Channel to port buses (CP0–CP2) are representative of parallel buses that are included in the read address bus (RA). Similar parallel buses are provided for a write address bus and a data output bus, not shown. Port to channel buses (PC0–PC1) are representative of parallel buses that are included in data input bus DI. Scheduling circuitry (420, 421) includes request allocator circuitry, interleaver circuitry and multiplexer circuitry and selects one of the channel to port buses to be connected to an associated port controller (460, 461) on each clock cycle for providing an address for a transaction performed on each clock cycle. The schedulers operate in parallel and source/destination channel addresses are transferred in parallel to each scheduler via the parallel channel to port buses. Input/output data words are also transferred in parallel to/from each port. Each port is tailored to provide an access protocol required by its associated resource. The ports may be tailored to provide an access protocol required by a different type of resource. Channel and scheduling circuitry within a sub-portion (400a) of the DMA controller can interact with various versions of tailored ports without being modified.

18 Claims, 11 Drawing Sheets

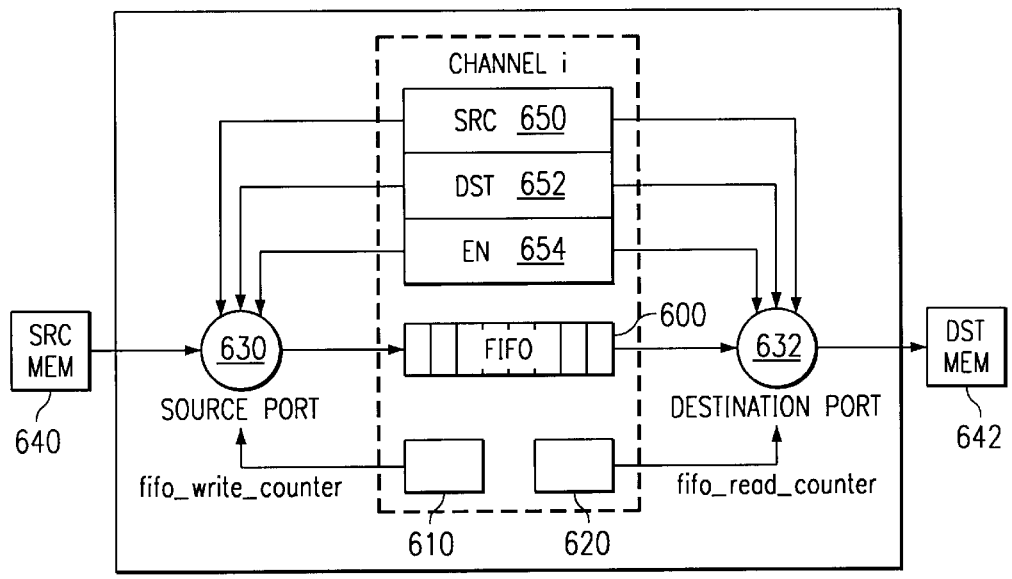
FIG. 6
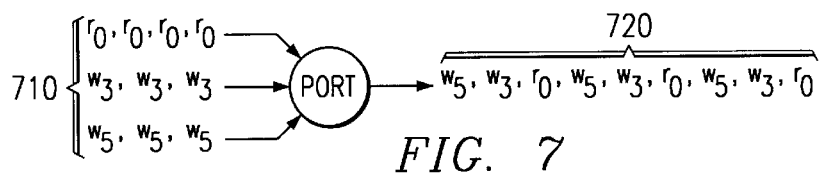
FIG. 7
| 15 | 14 | 13 12 | 11 6 | 5 0 |
|---|---|---|---|---|
| FREE | CPU/DMA | EHPI | PRIO[5:0] | DE[5:0] |
FIG. 8
| 15 14 | 13 12 | 11 10 | 9 8 | 7 6 | 5 | 4 0 |
|---|---|---|---|---|---|---|
| WDBRT[1:0] | SIND[1:0] | SRC[1:0] | DIND[1:0] | DST[1:0] | FS | DSYN[4:0] |
FIG. 9

| 15 | 8 | 7 | 6 | 5 | 4 | 3 | 2 | 1 | 0 |
|---|---|---|---|---|---|---|---|---|---|
| RESERVED | | CLEAR STATUS | AUTOINIT | DROP IE | BLOCK IE | FRAME IE | 1st HALF IE | LAST IE | TIMEOUT IE |

*FIG. 10*

| 15 | 7 | 6 | 5 | 4 | 3 | 2 | 1 | 0 |
|---|---|---|---|---|---|---|---|---|
| RESERVED | | SYNC STAT | DROP STAT | BLOCK STAT | FRAME STAT | 1st HALF STAT | LAST STAT | TIMEOUT STAT |

*FIG. 11*

| 15 | 14 | 13 | 7 | 6 | 0 |
|---|---|---|---|---|---|
| RESERVED | | MDP_DST | | MDP_SRC | |

*FIG. 12*

| 15 | 0 |
|---|---|
| SOURCE ADDRESS | |

*FIG. 13*

| 15 | 0 |
|---|---|
| DESTINATION ADDRESS | |

*FIG. 14*

| 15 | 0 |
|---|---|
| ELEMENT COUNT | |

*FIG. 15*

| 15 | 0 |
|---|---|
| FRAME COUNT | |

*FIG. 16*

| 15 | 0 |
|---|---|
| ELEMENT INDEX VALUE | |

*FIG. 17*

| 15 | 0 |
|---|---|
| FRAME INDEX VALUE | |

*FIG. 18*

|        | $t_0$ | $t_1$ | $t_2$ | $t_3$ | $t_4$ | $t_5$ | $t_6$ | $t_7$ | $t_8$ | $t_9$ | $t_{10}$ | $T_{11}$ | $T_{12}$ | $T_{13}$ |
|--------|-----|-----|-----|-----|-----|-----|-----|-----|-----|-----|------|------|------|------|
| r_a0   | a1  | a2  | a3  | a4  | a5  | e   |     |     |     |     |      |      |      |      |
| r_a1   | a0  | a1  | a2  | a3  | a4  | a5  | e   |     |     |     |      |      |      |      |
| r_a2   |     | a0  | a1  | a2  | a3  | a4  | a5  |     |     |     |      |      |      |      |
| r_a3   |     |     | a0  | a1  | a2  | a3  | a4  | a5  |     |     |      |      |      |      |
| r_sa3  |     |     |     |     |     |     |     |     |     |     |      |      |      |      |
| r_aout |     |     |     | a0  | a1  | a2  | a3  | a4  | a5  |     |      |      |      |      |
| w_a0   | a1  | a2  | a3  | is  | is  | is  | is  | a4  | a5  | e   |      |      |      |      |
| w_a1   | a0  | a1  | a2  | is  | is  | is  | is  | a3  | a4  | a5  | e    |      |      |      |
| w_a2   |     | a0  | a1  | is  | is  | is  | is  | a2  | a3  | a4  | a5   |      |      |      |
| w_a3   |     |     | a0  | is  | is  | is  | is  | a1  | a2  | a3  | a4   | a5   |      |      |
| w_sa3  |     |     |     |     |     |     |     |     |     |     |      |      |      |      |
| w_aout |     |     |     |     |     |     |     | a0  | a1  | a2  | a3   | a4   | a5   |      |
| r_rdy  | 0   | 1   | 1   | 1   | 1   | 1   | 1   | 0   |     |     |      |      |      |      |
| r_inter|     |     | a0  | a1  | a2  | a3  | a4  | a5  |     |     |      |      |      |      |
| r_sinter|    |     |     |     |     |     |     |     |     |     |      |      |      |      |
| r_req  |     |     | a0  | a1  | a2  | a3  | a4  | a5  |     |     |      |      |      |      |
| r_ack  |     |     |     | a0  | a1  | a2  | a3  | a4  | a5  |     |      |      |      |      |
| w_rdy  | 0   | 0   | 0   | 0   | 0   | 1   | 1   | 1   | 1   | 1   | 1    | 0    |      |      |
| w_inter|     |     |     |     |     |     |     | a0  | a1  | a2  | a3   | a4   | a5   |      |
| w_sinter|    |     |     |     |     |     |     |     |     |     |      |      |      |      |
| w_req  |     |     |     |     |     |     |     | a0  | a1  | a2  | a3   | a4   | a5   |      |
| w_ack  |     |     |     |     |     |     |     |     | a0  | a1  | a2   | a3   | a4   | a5   |
| w_com  |     |     | +   | +   | +   | +   | +   | +   | −   | −   | −    | −    | −    | −    |
| nw_cnt | 0   | 0   | 1   | 2   | 3   | 4   | 5   | 6   | 5   | 4   | 3    | 2    | 1    | 0    |
| r_com  |     |     |     | +   | +   | +−  | +−  | +−  | +−  | −   | −    |      |      |      |
| nr_cnt | 0   | 0   | 0   | 0   | 1   | 2   | 2   | 2   | 2   | 2   | 1    | 0    |      |      |
| FIFO 7 |     |     |     |     |     |     |     |     |     |     |      |      |      |      |
| FIFO 6 |     |     |     |     |     |     |     |     |     |     |      |      |      |      |
| FIFO 5 |     |     |     |     |     |     |     |     |     |     |      |      |      |      |
| FIFO 4 |     |     |     |     |     |     |     |     |     |     |      |      |      |      |
| FIFO 3 |     |     |     |     |     |     |     |     | a3  | a4  | a5   |      |      |      |
| FIFO 2 |     |     |     |     |     |     |     | a2  | a2  | a3  | a4   | a5   |      |      |
| FIFO 1 |     |     |     |     |     |     | a1  | a1  | a1  | a2  | a3   | a4   | a5   |      |
| FIFO 0 |     |     |     |     |     | a0  | a0  | a0  | a0  | a1  | a2   | a3   | a4   | a5   |

*FIG. 22*

MULTI-CHANNEL DMA WITH SCHEDULED PORTS

CROSS REFERENCE TO RELATED APPLICATIONS

This application claims priority to S.N. 99401389.4, filed in Europe on Jun. 9, 1999 (TI-29028EU).

This application is related to co-assigned U.S. patent applications Ser. No. _____ 09/591,623 (TI-29029), Ser No. _____ 09/591,615 (TI-29030); and Ser. No. _____ 09/591,535 (TI-29031), co-filed contemporaneously herewith and incorporated herein by references.

TECHNICAL FIELD OF THE INVENTION

This invention generally relates to microprocessors, and more specifically to improvements in direct memory access circuits, systems, and methods of making.

BACKGROUND OF THE INVENTION

Microprocessors are general purpose processors which provide high instruction throughputs in order to execute software running thereon, and can have a wide range of processing requirements depending on the particular software applications involved. A direct memory access (DMA) controller is often associated with a processor in order to take over the burden of transferring blocks of data from one memory or peripheral resource to another and to thereby improve the performance of the processor.

Many different types of processors are known, of which microprocessors are but one example. For example, Digital Signal Processors (DSPs) are widely used, in particular for specific applications, such as mobile processing applications. DSPs are typically configured to optimize the performance of the applications concerned and to achieve this they employ more specialized execution units and instruction sets. Particularly in applications such as mobile telecommunications, but not exclusively, it is desirable to provide ever increasing DSP performance while keeping power consumption as low as possible.

SUMMARY OF THE INVENTION

Particular and preferred aspects of the invention are set out in the accompanying independent and dependent claims. Combinations of features from the dependent claims may be combined with features of the independent claims as appropriate and not merely as explicitly set out in the claims. The present invention is directed to improving the performance of processors, such as for example, but not exclusively, digital signal processors.

In accordance with a first aspect of the invention, there is provided a digital system with a multi-channel direct memory access (DMA) controller, wherein the DMA controller comprises a plurality of channel circuits each having at least one channel address output node for providing a channel address and at least one request output; and a plurality of port circuits each having a plurality of channel address input nodes connected to a respective channel address output node of the plurality of channel circuits, each port circuit of the plurality of port circuits having a memory address output node for providing a channel address selected from the plurality of address input nodes to a respective associated memory resource. Each port has a scheduler circuit connected to the request outputs on the plurality of channel circuits. The scheduler circuit is operable to select the next request that will be served by the port, such that the plurality of port circuits are operable to access the respective associated memory resources simultaneously.

In accordance with another aspect of the present invention, each channel circuit has a FIFO buffer and at least one of the port circuits is operable to perform a burst transfer of data between the FIFO buffer of a selected channel circuit and the memory circuit associated with the at least one port circuit.

In accordance with another aspect of the present invention, each channel circuit has a read address circuit and a separate write channel address circuit. There is a separate bus connected from each read address circuit to the respective channel address input nodes of the plurality of port circuits and a separate bus connected from each write address circuit to the Cross Reference to Related Applications respective channel address input nodes of the plurality of port circuits.

In accordance with another aspect of the present invention, a method of operating a digital system comprising a microprocessor, wherein the microprocessor is connected to a multi-channel direct memory access circuit having a plurality of channel circuits and a plurality of port circuits each connected to a memory resource for transferring data words, is provided. A plurality pending transfer requests with transfer addresses is generated simultaneously in the channel circuits. All of the pending transfer requests are provided to each of the plurality of port circuits. Each port is scheduled individually by selecting a transfer request and a channel from among the pending transfer requests. A data transfer is performed between each port and the selected channel such that all of the plurality of ports transfer a requested data word on the same clock cycle.

DESCRIPTION OF THE DRAWINGS

Particular embodiments in accordance with the invention will now be described, by way of example only, and with reference to the accompanying drawings in which like reference signs are used to denote like parts and in which the Figures relate to the digital system of FIG. 1 and the DMA controller of FIG. 2, unless otherwise stated, and in which:

FIG. 6 is a block diagram illustrating the resources involved in scheduling each channel of the DMA controller;

FIG. 7 is a timing schematic illustrating round robin scheduling in the DMA controller;

FIG. 8 illustrates a DMA Enable/Disable control register;

FIG. 9 illustrates a DMA Channel Control register;

FIG. 10 illustrates an additional DMA channel register;

FIG. 11 illustrates a DMA channel status register;

FIG. 12 illustrates a DMA main data page register;

FIG. 13 illustrates a DMA source address register;

FIG. 14 illustrates a DMA destination address register;

FIG. 15 illustrates a DMA element count register;

FIG. 16 illustrates a DMA frame count register;

FIG. 17 illustrates a DMA element index register;

FIG. 18 illustrates a DMA element frame index address register;

FIG. 22 is a timing diagram illustrating a transfer of six words from the SARAM port to the RHEA port;

Corresponding numerals and symbols in the different figures and tables refer to corresponding parts unless otherwise indicated.

DETAILED DESCRIPTION OF THE INVENTION

Although the invention finds particular application to Digital Signal Processors (DSPs), implemented, for example, in an Application Specific Integrated Circuit (ASIC), it also finds application to other forms of processors. An ASIC may contain one or more megacells which each include custom designed functional circuits combined with pre-designed functional circuits provided by a design library.

Figure 1:
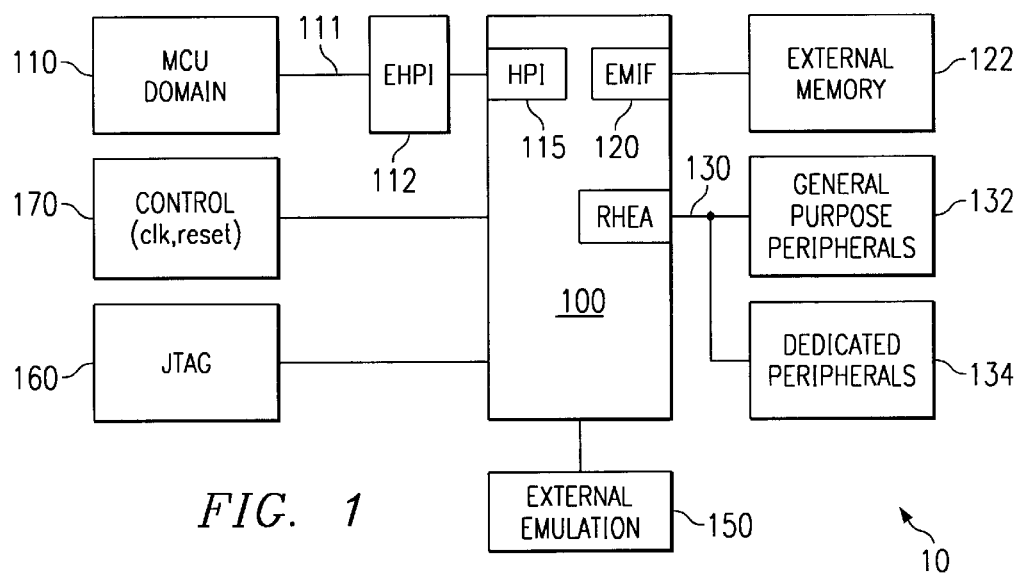
FIG. 1 is a block diagram of a digital system that includes an embodiment of the present invention.

FIG. 1 is a block diagram of a digital system that includes an embodiment of the present invention. Megacell 100 includes a CPU, DMA controller and memory circuits, and will be described in greater detail later. Host processor 110 is connected to megacell 100 via enhanced host port interface (EHPI) 112. EHPI 112 provides multiplexing of the host address and data bus 111 to match the host port interface 115 provided by megacell 100. Memory 122, general purpose peripherals 132 and dedicated peripherals 134 can be accessed by host processor 110 or the CPU within megacell 100. Control circuitry 170 provides timing signals for circuitry within megacell 100. MCU 110 includes its own timing circuitry, which requires that accesses by MCU 110 to resources controlled by megacell 100 must be synchronized to the time base of megacell 100.

JTAG test port 160 contains hardware extensions for advanced debugging features. These assist in the user's development of the application system (software and the hardware) utilizing only the JTAG interface, a test access port and boundary-scan architecture defined by the IEEE 1149.1 standard with extended operating mode enhancements, as described in U.S. Pat. No. 5,828,824. Emulation circuitry 150 provides debug program control and execution tracing facilities.

Figure 2:
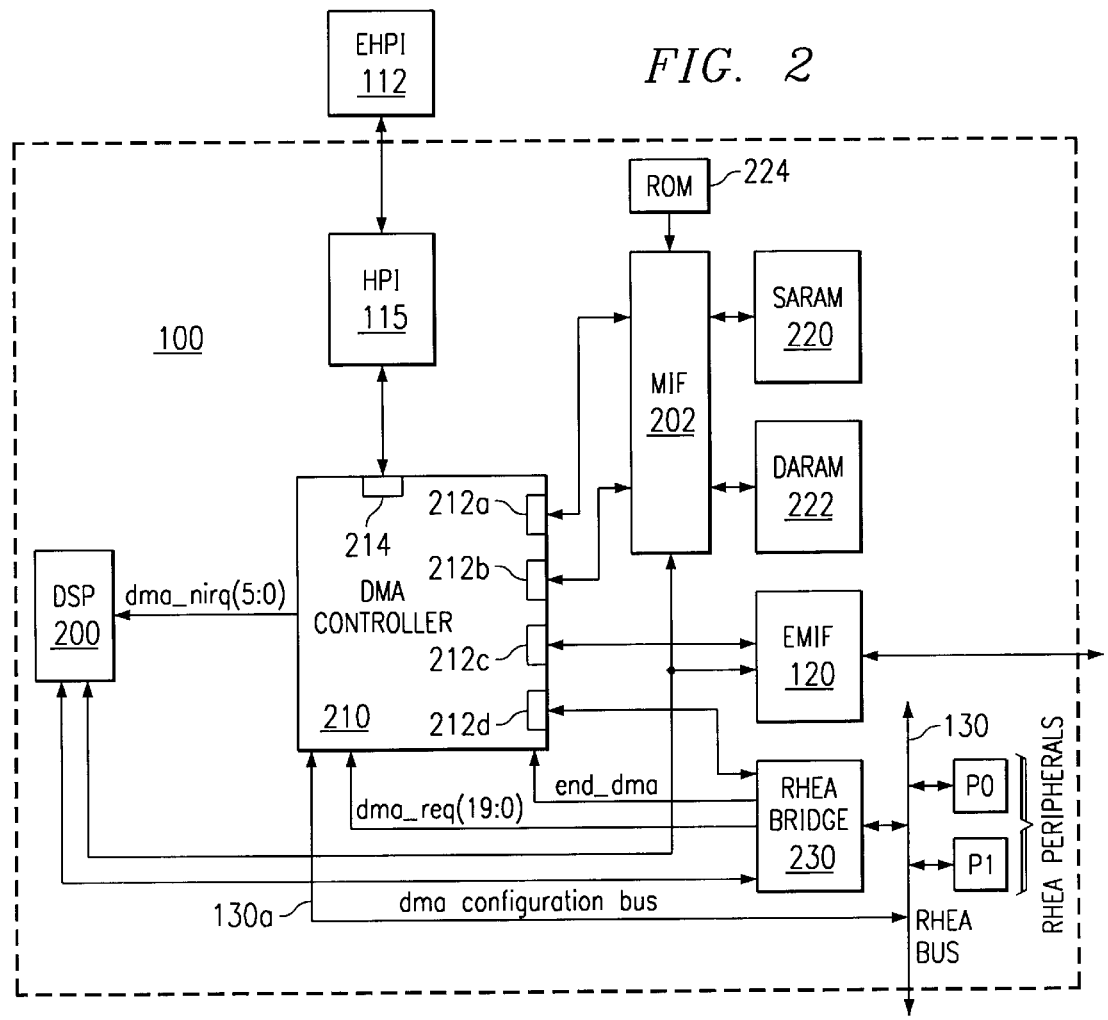
FIG. 2 is a more detailed block diagram of a megacell from FIG. 1.

FIG. 2 is a more detailed block diagram of megacell 100. CPU 200 is a digital signal processor (DSP). CPU 200 accesses memory circuits 220, 222 and 224 via memory interface circuitry 202. CPU 200 accesses external memory via external memory interface (EMIF) 120. CPU 200 access other resources via RHEA bridge 230 to RHEA bus 130. According to an aspect of the present invention, DMA controller 210 is a multi-channel DMA controller with separate channel and port controllers with each port having local scheduling circuitry. DMA 210 can be programmed to transfer data between various sources and destinations within digital system 10, such as single access RAM 220, dual access RAM 222, external memory 122 via external memory interface 120, and peripheral devices on resource bus (RHEA) 130 via RHEA bridge 230. MCU 110 can also access these resources via host port interface (HPI) 115 which is connected to DMA controller 210. The path between the HPI port and the Memory is a DMA channel.

Memory circuit 220 is a 128K×16 Single Access RAM (SARAM), comprising sixteen 32K byte modules. DMA 210 can access the SARAM by a 16 bit DMA bus. The DMA bus access (R/W) can be in SAM (Shared access mode) or in HOM mode (Host only mode). An access by MCU 110 in HOM mode will bypass synchronization circuitry within DMA 210 that synchronizes MCU timing to megacell 100 timing. The priority scheme between CPU 200 and DMA 210 is programmable. The priority circuitry is implemented in the SARAM, whereas the control register is located in the DMA IO space accessible via RHEA bus branch 130a.

Memory circuit 222 is a 32K×16 Dual Access RAM (DARAM) comprising four 16 K byte modules. CPU 200 can perform two accesses to one DARAM memory module in one cycle; for example, a single read and single write, or a long read and a long write, a dual read and a single write etc. The priorities assigned to the different accesses are handled by the DARAM. The priority scheme between CPU and DMA is programmable. The priority circuitry is implemented in the DARAM, whereas the control register is located in the DMA IO space accessible via the RHEA bus.

Another embodiment of the present invention may have different configurations of memory and peripherals.

FIG. 2 only shows those portions of megacell 100 that are relevant to an understanding of an embodiment of the present invention. Details of general construction for DSPs are well known, and may be found readily elsewhere. For example, U.S. Pat. No. 5,072,418 issued to Frederick Boutaud, et al, describes a DSP in detail and is incorporated herein by reference. U.S. Pat. No. 5,329,471 issued to Gary Swoboda, et al, describes in detail how to test and emulate a DSP and is incorporated herein by reference. Details of 10 portions of DMA controller 210 relevant to an embodiment of the present invention are explained in sufficient detail hereinbelow, so as to enable one of ordinary skill in the microprocessor art to make and use the invention.

Table 1 summarizes several of the acronyms used throughout this document.

TABLE 1

| Glossary of Terms | |
|---|---|
| DMA | Direct Memory Access |
| MIF | Memory Interface |
| EMIF | External Memory Interface |
| HPI | Host Port Interface |
| RHEA | Resource access bus, for peripheral devices and memory mapped register access |
| SARAM | Single Access RAM |
| DARAM | Dual Access RAM |
| PDROM | Program and Data ROM |
| HOM_M | Host Only Mode Memory |
| SAM_M | Share Access Mode Memory |
| HOM_R | Host Only Mode RHEA |
| SAM_R | Share Access Mode RHEA |
| DSP | Digital Signal Processor |
| CPU | a microprocessor within a megacell on an integrated circuit (IC), such as a DSP. |
| MCU | a second processor that interacts with the CPU, may act as a master, or host, processor |
| EHPI | Enhanced Host Port Interface. |

TABLE 1-continued

Glossary of Terms

| | |
|---|---|
| Element | the atomic unit of data transferred by the DMA. An element can be a word, 2 words, a burst of 4 words, or a burst of 8 words. |
| Frame | set of elements. |
| FIFO | first in, first out buffer |

DMA controller 210 transfers data between points in the memory space without intervention by the CPU. The DMA allows movements of data to and from internal memory, external memory and peripherals to occur in background of CPU operation. The DMA has six independent programmable channels allowing six different contexts for DMA operation, executed in Time Division Multiplexed (TDM) mode.

The DMA architecture is organized around ports and channels.

Referring still to FIG. 2, each resource the DMA can access has its own port: SARAM port 212a, DARAM port 212b, EMIF port 212c, and RHEA port 212d. HPI port 214 is a special case, which will be discussed later. A port can make read and write accesses to the resource it is connected, through a dedicated bus.

This DMA controller meets the need of high rate flow and multi-channel applications such as wireless telephone base stations or cellular handset data traffic.

Figure 3A:
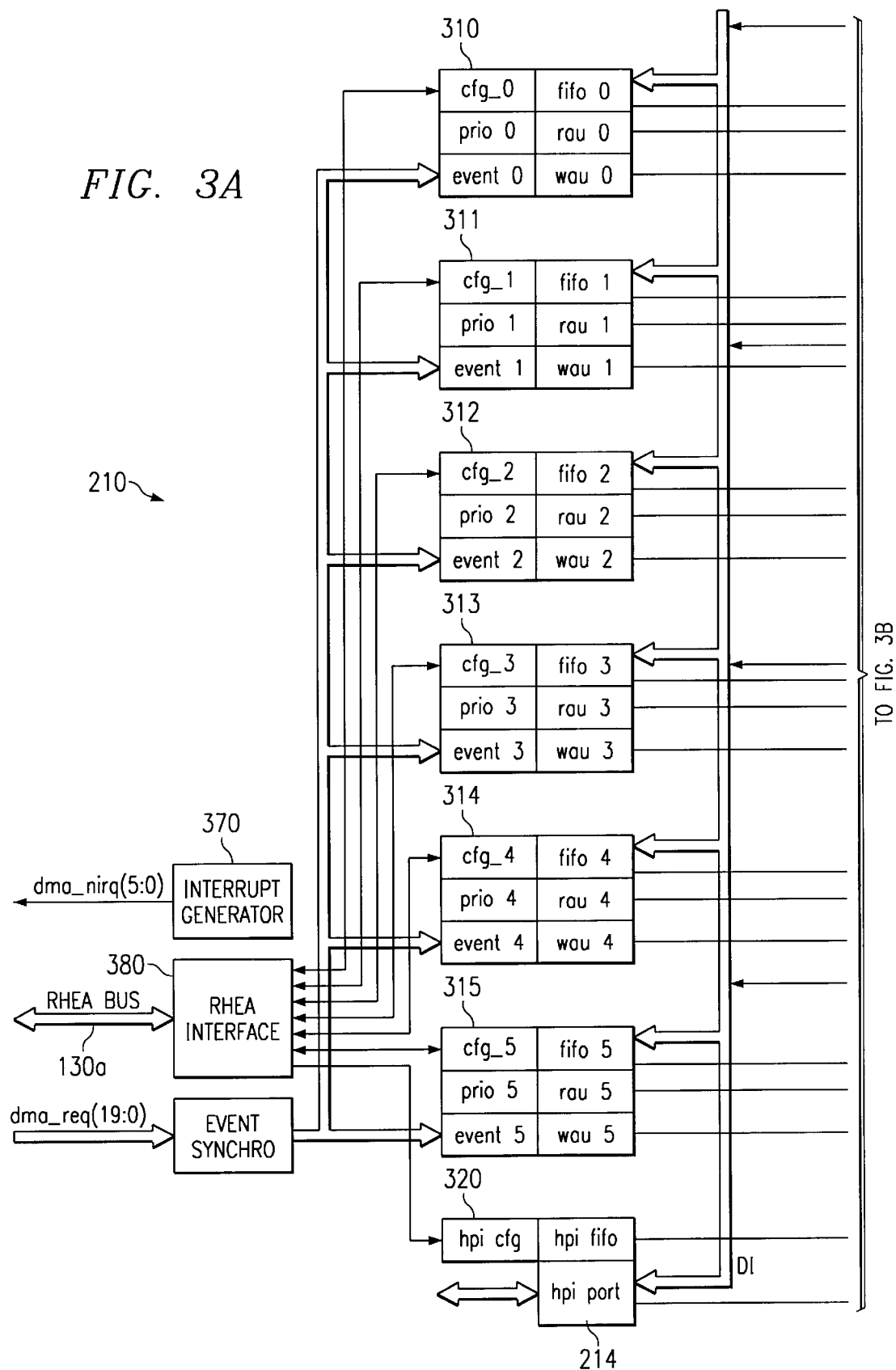
FIG. 3 is a detailed block diagram of the DMA controller of FIG. 2.
Figure 3B:
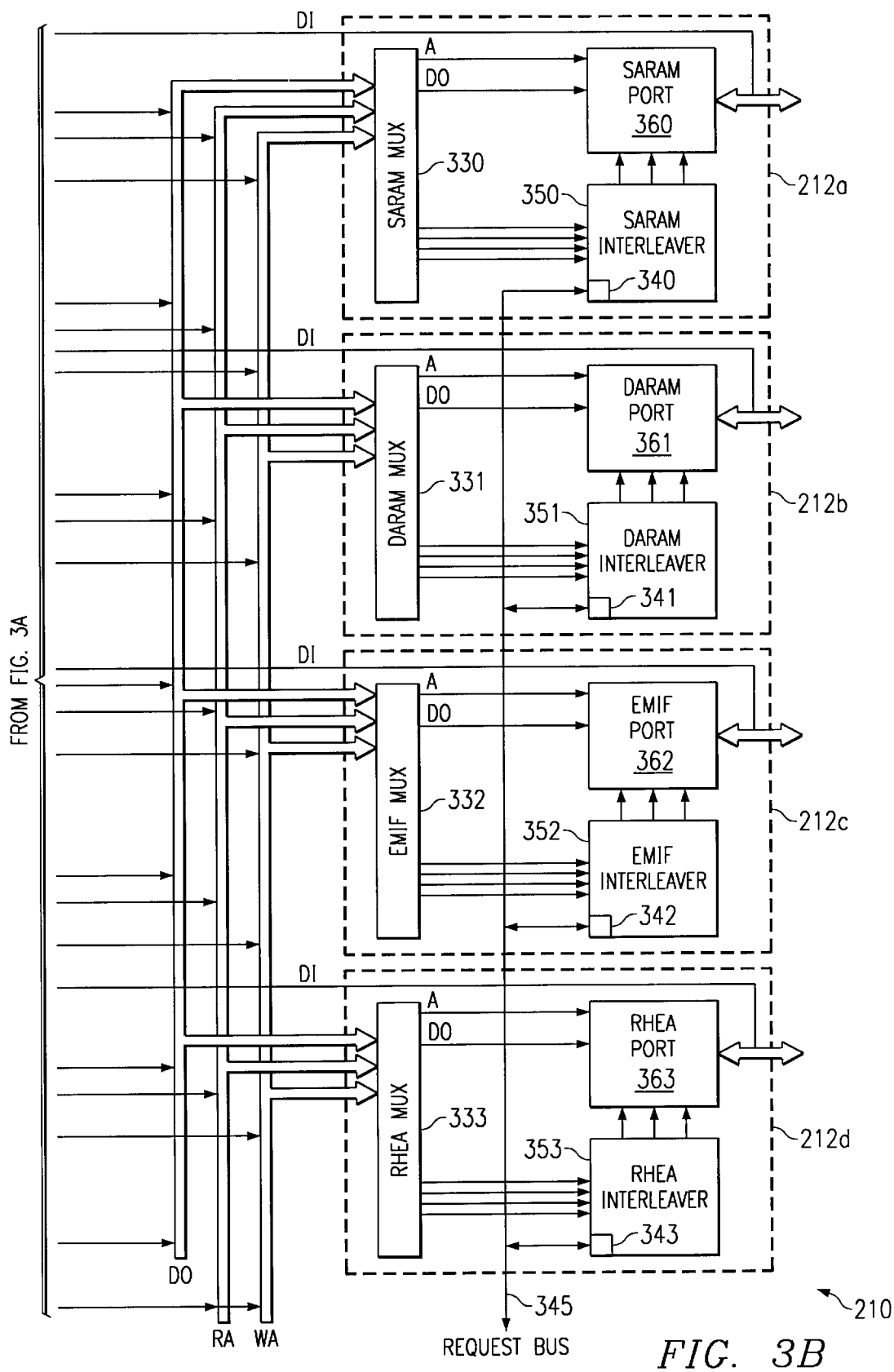

FIG. 3 is a detailed block diagram of the DMA controller of FIG. 2. A channel includes a source port, a FIFO and a destination port, and according to an aspect of the present invention the source port and destination port of each channel is dynamically programmable. Six channels are available in the present embodiment, although other embodiments may have alternate numbers of channels. Six channel controllers 310–315 control the six channels. All six channels are multiplexed on each port via respective port multiplexers 330–333. Each channel control has a respective FIFO(n). The FIFOs aren't shared by the channels; each channel has its own FIFO. This allows more independence between transfers. A DMA transfer in channel (n) is made in two steps: the source port performs a read access on a source resource, gets the data and puts it in the channel (n) FIFO; once the data is in the FIFO, the destination port is activated and performs a write access to the destination resource to write the data. Each channel controller includes a separate read address unit RAU(0–5) and a separate write address unit WAU(0–5).

All of the ports operate in parallel. In this embodiment, there are four ports connected the four data storage resources, therefore, four concurrent read/write accesses can be made on the same clock cycle. In order to support this access rate, the address computation and the interleaving are pipelined. Maximum transfer rate for this embodiment with four ports is two words (two reads and two writes) per CPU cycle. This is achieved when sources and destinations are independent. An alternate embodiment may have a larger number of ports with a correspondingly higher maximum transfer rate.

A read address bus RA includes seven individual buses for conveying a channel read address from each read address unit RAU(0–5) and from the HPI port to each port input mux 330–333 in parallel. A write address bus WA includes seven individual buses for conveying a channel write address from each write address unit WAU(0–5) and from the HPI port to each port input mux 330–333 in parallel. Likewise, a data output bus DO includes seven individual buses for conveying a data output value from each FIFO(0–5) and from the HPI port to each port input mux 330–333 in parallel. A data input bus DI includes four individual buses for conveying a data input value from each port to each FIFO(0–5) and to the HPI port in parallel.

A DMA port sends a request to its associated memory to read or write a data item in this memory. A transfer of one word consists of a read request on a source port i following by a write request on destination port j (i can be equal to j). A request is defined by its type (r for read, w for write) and the channel it belongs to.

example:

$r_i$ is a read request in channel i $w_j$ is a write request in channel j

Each port has its own interleaver 350–353 to control the channel multiplexing on the associated port. The interleaver receives read and write requests from each channel, computes which is the next request that must be served, and triggers a port control state machine to serve this request.

DMA controller 210 has distributed request allocators 340–343 respectively associated with port. There can be up to thirteen requests pending on any given clock cycle: six read requests, six write requests, and an HPI request. In order to reduce interleaver complexity, an interleaver in the present embodiment can interleave a maximum of five simultaneous requests at the same time. Request allocators 340–343 scans the DMA configuration and pending requests signals on request bus 345 and selects a maximum of five request signals to send to each interleaver for processing. In an alternate embodiment, allocators 340–343 may be grouped together into a single allocator circuit. In another embodiment, a more complex interleaver may directly receive and schedule all requests provided by all of the channels.

Each port has an associated port control block 360–363. These blocks are responsible for initiating the read/write accesses to the memories and peripherals. They implement the transaction access protocol between the memories or peripherals and the DMA. These protocols are the same for SARAM and DARAM. The RHEA bus protocol and the EMIF protocol are different. Thus, each port is tailored to the type of resource to which it is connected.

Each channel controller has an associated priority block PRIO(0–5). The function of this block is to implement a three level priority scheme available in the DMA: high priority for HPI, high priority for channels, low priority for channels.

Each channel controller has an associated event synchronization block EVENT(0–5). Each event synchronization block waits for events that trigger a transfer in its channel. Each block also looks for event drops.

Channel FIFOs each have eight stages in this embodiment. FIFO receive the data communicated from a source port to a destination port. They allow the pipelining of DMA transfers and the bursting to/from external memories. Bursts of eight data words are possible in all channels.

Interrupt generator 370 generates interrupts to the CPU according to the DMA configuration and state. Each channel has its own associated interrupt signal, dma_nirq(5–0).

RHEA interface 380 interfaces RHEA bus 130a from the RHEA bridge. RHEA interface 380 is used only for CPU reads and writes in the DMA configuration registers. DMA accesses to RHEA peripherals are made through the RHEA port, not through the RHEA interface.

Descriptor blocks CFG(0–5) are used to control and monitor the status of the DMA transfers. There is one descriptor block per channel. They are read/written via RHEA interface 380.

HPI port 214 allows direct transfers between the HOST and the memory. This path supports HOM and SAM mode. In HOM mode, the DMA Registers are by-passed. Switching from SAM to HOM requires the DMA HOST channel to be empty before switching.

Figure 4:
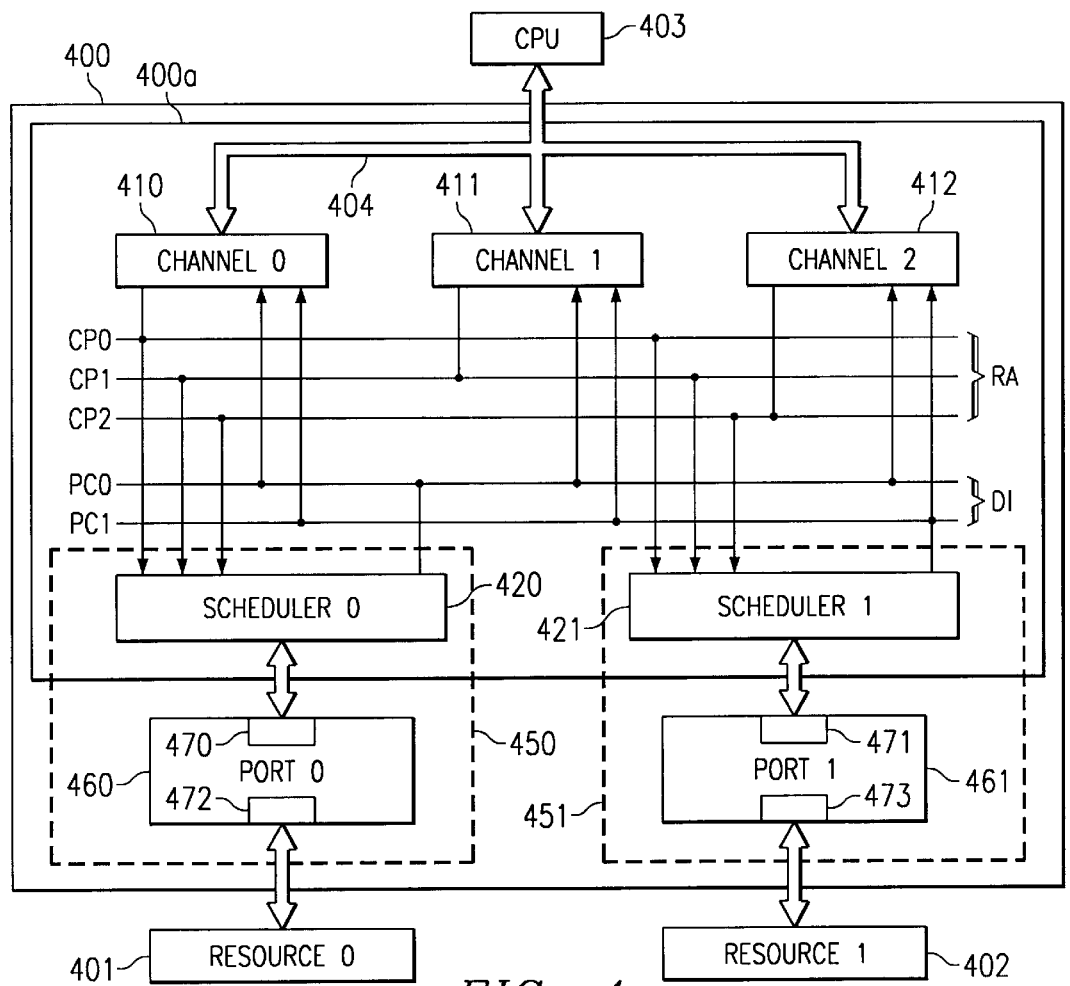
FIG. 4 is a block diagram of a portion of the DMA controller illustrating the parallel bus structure.

FIG. 4 is a block diagram of a portion of a DMA controller 400 illustrating the parallel bus structure. DMA controller 400 is representative of DMA controller 210, but is simplified in order to more clearly illustrate the parallel bus structure. Only three channel controllers 410–412 and two ports 450–451 are illustrated for clarity. Channel to port buses CP(0–2) are representative of the parallel buses that are included in the read address bus RA, write address bus WA and data output bus DO of FIG. 3. In this figure, only read address bus RA is shown, for clarity. Likewise, port to channel buses PC(0–1) are representative of the parallel buses that are included in data input bus DI. Scheduling circuitry 420 within port 450 includes request allocator circuitry, interleaver circuitry and mux circuitry and selects one of channel to port buses CP(0–2) to be connected to port controller 460 on each clock cycle for providing an address for a transaction performed on each clock cycle. Likewise, scheduling circuitry 421 within port 451 includes request allocator circuitry, interleaver circuitry and mux circuitry and selects one of channel to port buses CP(0–2) to be connected to port controller 461 on each clock cycle for providing an address for a transaction performed on each clock cycle. Advantageously, each scheduler 420–421 operates in parallel and source/destination address words are transferred in parallel to each scheduler via parallel buses represented by CP0–CP2. Advantageously, input/output data words are also transferred in parallel to/from each port controller 460–461.

CPU 403 provides configuration information to DMA controller 400 via bus 404. First port 460 is connected to resource 401 and second port 461 is connected to a second resource 402. Port controller 460 is tailored to provide an access protocol required by resource 401, while port controller 461 is tailored to provide an access protocol required by resource 402.

A channel interface 470 within port controller 460 receives the selected channel address and data signals from scheduling circuitry 420. Channel interface 471 within port controller 461 receives the selected channel address and data signals from scheduling circuitry 421. Memory interface 472 within port controller 460 provides a connection to memory resource 401 for transferring address and data. Memory interface 472 within port controller 460 provides a connection to memory resource 401 for transferring address and data. According to an aspect of the present invention, channel interfaces 470–471 on all of the ports in the DMA controller are identical, while memory interfaces 472–473 are tailored to match the transfer protocol of the associated memory resource.

In an alternative embodiment, port controllers 460–461 may be tailored to provide an access protocol required by a different type of resource. Advantageously, channel and scheduling circuitry within channel controller portion 400a of DMA controller 400 can interact with various versions of tailored port controllers without being modified.

Referring again to FIG. 2, DMA Controller 210 allows eight types of transfer mode for internal, external memory and peripherals by each channel, while the EHPI allows four types of transfers, as summarized in Table. 2 Data transfer from peripheral to peripheral, such as from the receive side of a serial port to the transmit side of another serial port, is not directly supported by the DMA. Memory must be used as a temporary buffer to implement peripheral to peripheral DMA transfers.

TABLE 2

Transfer Mode Summary

| | | |
|---|---|---|
| Internal Memory | → | Internal Memory |
| External Memory | → | External Memory |
| Internal Memory | → | External Memory |
| Internal Memory | ← | External Memory |
| Internal Memory | → | Peripherals |
| Internal Memory | ← | Peripherals |
| External Memory | → | Peripherals |
| External Memory | ← | Peripherals |
| Internal Memory | → | EHPI |
| EHPI | ← | Internal Memory |
| External Memory | → | EHPI |
| EHPI | ← | External Memory |

The channel descriptors summarized in Table 3 are used to configure a transfer in channel i.

TABLE 3

Channel Descriptors

| | |
|---|---|
| channel[i].src | source of the transfer; channel[i].src = {0,1,2,3}, set of port numbers. |
| channel[i].dst | destination of the transfer; channel[i].dst = {0,1,2,3}, set of port numbers. |
| channel[i].en | enable/disable of the channel; channel[i].en = {0,1}, where 0 means channel disabled and 1 means channel enabled. |

Figure 5:
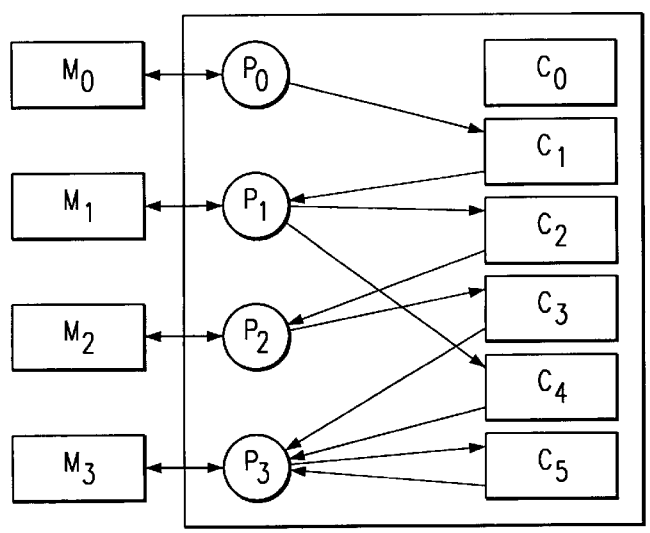
FIG. 5 is an activity diagram illustrating one example of a configuration for the DMA controller.

Table 4 illustrates an example configuration of the six channels of the present embodiment, which is also illustrated in FIG. 5. In FIG. 5, each channel is indicated by boxes labeled C(0–5); each port is indicated by circles labeled P(0–3), and each resource is indicated by boxes labeled M(0–3).

TABLE 4

Example DMA Configuration

| | |
|---|---|
| channel[0].src = | channel[3].src = 2 |
| channel[0].dst = | channel[3].dst = 3 |
| channel[0].en = 0 | channel[3].en = 1 |
| channel[1].src = 0 | channel[4].src = 1 |
| channel[1].dst = 1 | channel[4].dst = 3 |
| channel[1].en = 1 | channel[4].en = 1 |
| channel[2].src = 1 | channel[5].src = 3 |
| channel[2].dst = 2 | channel[5].dst = 3 |
| channel[2].en = 1 | channel[5].en = 1 |

Advantageously, there are no limitations in the DMA configuration. A channel can loop on a port, in which case the same port is source and destination for a transfer, allowing copy of a data block from an address to another address in the same memory, eg: channel[i].src=channel[i].dst. Any number of channels can be time-multiplexed on the same port, eg: channel[0].src=channel[1].src=channel[2].src. All the channels can loop on the same port, eg: channel[i].src=channel[i].dst =channel[j].src=channel[j].dst, for all i∈{0,1,2,3,4,5}, for all j∈{0,1,2,3,4,5}, i≠j.

Advantageously, this embodiment of the DMA controller allows two transfers to be fully parallel, if they involve different ports, eg: channel[i].src =0, channel[i].dst=1, for a i∈{0,1,2,3,4,5}; channel[j].src=2, channel[j].dst =3, for a j∈{0,1,2,3,4,5 }; i≠j.

Scheduling

In order to provide the flexibility described above, each port has its own scheduling circuitry. When several channels want to have access to a DMA port they send requests to this port. The port must compute which request it is going to serve, which is referred to herein as scheduling.

The number of requests a port has to schedule depends on the DMA configuration, as programmed by the CPU for a given application. Round robin service is used to assure all of the requests waiting for service will be served. The scheduling is independent of the resource the port is connected to; therefore, the same scheduling algorithm is used for all ports. As used herein, "a request is scheduled" means that the port scheduler has computed which request (among all the requests requiring this port) it is going to serve at the next clock cycle. "A request is acknowledged" means that a memory sends an acknowledge signal after it has received a request from the port it is connected to.

FIG. 6 is a block diagram illustrating the resources involved in scheduling each channel of the DMA controller. Each channel has two counters to monitor the state of its FIFO. A channel[i] FIFO_write_counter 610 counts the number of writes that are going to be made in FIFO 600. It is incremented each time a read request $r_i$ is scheduled on channel i source port 630. The FIFO_write_counter is decremented each time a request $w_i$, is acknowledged on channel i destination port 632 (i.e. each time a data of channel i is written into destination memory 642). The reset value of this counter is zero. Channel i generates a write request to a port p if there is at least one data in the channel i FIFO.

A channel[i] FIFO_read_counter 620 counts the number of data that can be read in FIFO 600. It is incremented each time a read request $r_i$ is acknowledged on channel i source port 630 (i.e. each time a data is read from source memory 640). Channel[i] FIFO_read_counter 620 is decremented each time a write request $w_i$ is scheduled on channel i destination port 630. The reset value of this counter is zero. Channel i generates a read request to a port p if there is at least one place to store the data read in the channel i FIFO 600.

A write request on the destination port can appear only if channel[i].

FIFO_read_counter >0, i.e. only after a read request has been served in the source port.

The scheduler scans all the channels descriptor registers (source descriptor 650, destination descriptor 652, and enable descriptor 654) and FIFO counters (FIFO_write_counter 610 and FIFO_read_counter 620) to see if requests are waiting to be served. Each possible request is given a request identifier, i.e.: channel(i) read request identifier=i*2, where i∈{0,1,2,3,4,5}; channel(i) write request identifier= i*2+1.

The total number of possible active channel requests in the DMA is twice the number of channels, since a write and a read requests are possible in each channel. Additionally, a request from the HPI port is treated as a DMA channel request. If there is a request waiting, it is served. If there are several requests waiting, they are served on a round robin scheme: if request r is the current request served, the next request served will be:

request (r+1) mod REQUEST_NUMBER, if this request exists else request (r+2) mod REQUEST_NUMBER, if this request exists else request (r+3) mod REQUEST_NUMBER, if this request exists

. . .

else request (r+REQUESTNUMBER) mod REQUEST_NUMBER, if this request exists else none FIG. 7 is a timing schematic illustrating round robin scheduling in the DMA controller. A set of requests indicated at 710 will be served in the order indicated at 720.

The scheduling algorithm is described in more detail in Table 6 using psuedo code with terms defined in Table 5.

TABLE 5

Terms Used in Scheduling Algorithm

| inputs: | |
|---|---|
| current_request | the request identifier of the request served at current clock cycle c |
| the descriptors of each channel | src, dst and en |
| FIFO monitoring counters of each channel | FIFO_read_counter and FIFO_write counter |
| port_id | identifier of the port |
| FIFO_SIZE | size of the FIFOs |
| REQUEST_NUMBER | number of possible requests multiplexed on the port |
| outputs: | |
| next_request | the request identifier of the request that must be served at clock cycle c + 1. From this identifier the channel and the type of request to serve is known. |
| found | boolean flag, true when the next request to serve has been found. If after the scheduling computation, found is equal to zero, then no request is schedule and the current request remains the same. |
| variables: | |
| rid | request identifier index |
| found | boolean flag |
| i | channel number computed from rid |

TABLE 6

Scheduling Algorithm

```
rid = (current_request+1)%REQUEST_NUMBER;
found = 0;
while (( rid != current_request )&& !found ){
    i = rid/2;
    if( channel[i].en ){     /*channel is enabled */
if( channel[i].src == port_id ){   /* this port is source */
        if( channel[i]. FIFO_write_counter < FIFO_SIZE ){
             /* there is place in the FIFO */
            found = 1;
        channel[i]. FIFO_write_counter++;
```

TABLE 6-continued

Scheduling Algorithm

```
    }
    else{
        found = 0;          /* there is no place in the FIFO */
        rid = (rid+1)%REQUEST_NUMBER;    /* this request can't be served */
                            /* switch to the next request */
        }
    }
}
if(channel[i].dst == port_id ){      /* this port is dest */
    if( channel[i]. FIFO_write_counter>0 ){
                        /* there is data in the FIFO */
        found = 1;
        channel[i]. FIFO_read_counter--;
        }
    else{
        found = 0;          /* there is no data in the FIFO */
        rid = (rid+1)%REQUEST_NUMBER;    /* this request can't be served */
                            /* switch to the next request */
        }
    }
    else{          /* this port isn't used by the channel */
        found = 0;
        rid = (rid+1)%REQUEST_NUMBER;    /* switch to the next request */
    }
}
else{                      /* channel is disabled */
    found = 0;
    rid = (rid+1)%REQUEST_NUMBER;    /* switch to the next request */
    }
}
next_request = rid;
```

This scheduling computing is performed in one clock cycle in each of the DMA ports. This algorithm is generic and is the same for all the DMA ports. The only signal required from each of the resources is an acknowledge signal. If the resource does not have an acknowledge signal, then a known predictable response time is used. There is no direct communications between the source and the destination ports: both see only the FIFO monitoring counters. Thus the destination transfer rate conforms itself to the source reading rate. The scheduling algorithm works with any number of channels; the only limitation is the amount of time (clock period) available to compute next_request, and the area budget available for additional transistors, since a new channel adds a new FIFO and a new set of descriptors.

During operation, a given port can easily be specialized to handle only one channel or a subset of channels by disabling unwanted channels on the given port by using the enable descriptor register. In another embodiment, a given port can easily be specialized to handle only one channel or a subset of channels by permanently disabling unwanted channels on the given port.

Various control registers will now be described in more detail. The DMA control registers are memory mapped in a 64KW peripheral space of megacell 100. Another embodiment of the present invention may place the control registers in other memory address spaces, or the registers may be accessed directly, for example. FIG. 8 illustrates a single global DMA Channel Enable/Disable control register. Table 7 lists a set of control registers that are associated with DMA channel.

TABLE 7

Control Registers Associated With Each Channel

| LocalReg_addr | name | Description |
| --- | --- | --- |
| 0x0000 | DMCCRn | DMA Channel n Control Register |
| 0x0001 | DMCCR2n | DMA Channel n Control Register 2 |
| 0x0002 | DMMDPn | DMA channel n Main Data Page for source & destination memory address |
| 0x0003 | DMSRCn | DMA channel n Source address register |
| 0x0004 | DMDSTn | DMA channel n Destination address register |
| 0x0005 | DMECn | DMA channel n Element Count register |
| 0x0006 | DMFCn | DMA channel n Frame Count register |
| 0x0007 | DMEIDXn | DMA channel n Element Index |
| 0x0008 | DMFIDXn | DMA channel n Frame Index |
| 0x0009 | DMSTATn | DMA channel n Status register |

Referring to FIG. 8, the DMA Enable/Disable Control Register (DMEDC) is a 16-bit read/write register. It contains the DMA transfer priority and transfer enable control for each DMA channel. A DMA Enable/Disable Control Bit (DE[5:0]) field specifies the DMA enable/disable control for each channel (0=disabled, 1=enabled). The DE[5:0] fields are set to zero upon reset.

A Channel priority PRIO[5:0] field defines the priority of each channel: PRIO[i]=0 indicates channel i has a low priority; PRIO[i]=1 indicates channel i has a high priority. A HPI priority HPI[1:0 ] field defines the priority of the host port in relation to the DMA channels. When EHPI[1:0]=10 or 11, the HPI has the HIGHEST priority versus all DMA Channels, and can access on-chip RAM only. Other DMA channels cannot access on-chip RAM. When HPI[1:0]=01, the HPI is integrated in the DMA channel TDM flow and is treated as a HIGH priority channel. When HPI[1:0]=00, the HPI is integrated in the DMA channel TDM flow and is treated as a LOW priority channel. HPI[1:0]=11 upon reset.

Transfers of all channels are Time Division Multiplexed in a round-robin fashion. In a given round-robin queue, each channel is switched to the next channel after its read has been triggered. The low priority channels will be pending as long as high priority channels need to be triggered. Low priority channels are triggered in a round-robin fashion when event synchronized high priority channels are waiting for events and non synchronized high priority channels are completed.

Still referring to FIG. 8, a CPU/DMA busses priority bit specifies the priority of CPU 200 with respect to DMA controller 210 when both access the same memory resource. When CPU/DMA=1, CPU 200 busses have priority over DMA 210 busses for all internal and external memory accesses. When CPU/DMA=0, DMA 210 busses have priority over CPU 200 busses for all internal and external memory accesses.

A FREE bit controls a free run mode. If FREE=1, free run is selected in the situation when a breakpoint is encountered in a debugger, for example.

FIG. 9 illustrates a Channel Control register, as listed in Table 7. The DMA Channel Control Register DMCCRn is a 16-bit read/write register which controls the DMA operation of its associated channel. A DMA Word/Burst Transfer Mode (WDBRT[1:0]) field defines the element size of the transfer, as indicated in Table 8.

TABLE 8

Transfer Mode

| WDBRT value | Transfer Mode |
| --- | --- |
| 00 | 16 bits Word Mode |
| 01 | 32 bits Word Mode |
| 10 | 4*16 bits Burst Mode |
| 11 | 8*16 bits Burst Mode |

When the 32 bits word or burst transfer mode is enabled, two consecutive DMA transfers will be performed and the DMA state machine will also take care of it. Regardless of the index mode, the DMA address unit generates the address for most significant word (MSW) with the effective address value and the address for the least significant word (LSW) by inverting the LSB of the effective address.

Transfer Index Mode for Source (SIND[1:0]) field and transfer mode for destination (DIND[1:0 ]) field bits specify the index mode of addressing, as indicated in Table 9. The SIND & DIND bits are set to zero upon reset.

TABLE 9

Transfer Index Mode

| SIND/DIND Value | Index Mode |
| --- | --- |
| 00 | No modify |
| 01 | Post Increment |
| 10 | Post Increment with element index offset (DMEIDXn) |
| 11 | Post Increment with element and frame index offsets (DMEIDXn and DMFIDXn) |

A DMA Transfer Source Space Select (SRC[1:0]) field specifies the space select for the transfer source address. A Transfer Destination Space Select (DST[1:0]) field specifies the space select for the transfer destination address, as indicated in Table 10. Another embodiment may have different resources for source/destination.

TABLE 10

Transfer Space Selection

| SRC/DST value | Source Space |
| --- | --- |
| 00 | SARAM |
| 01 | DARAM |
| 10 | EMIF |
| 11 | RHEA |

A Frame Synchronization Bit controls frame synchronization. When FS=0, frame synchronization is disabled and element synchronization mode is enabled. Each element transfer waits for the selected event to occur before proceeding. When FS=1, frame synchronization is enabled. Each frame transfer waits for the selected event to occur before proceeding. Only one event is needed to synchronize an entire frame transfer (all the frame elements).

Element Synchronization Mode requires one event per element transfer (one element can be 16 bits word, or 32 bits word, a burst of 4*16 bits or 8*16 bits depending on the chosen element size). For example in 32-bit mode transfer, the DMA Controller requires only one event input for the consecutive two 16-bit word transfer.

Frame Synchronization Mode requires one event to trigger the entire frame transfer, which corresponds to the transfer of all the frame elements. If a channel is not event synchronized, a transfer on the channel is started when it is its turn in the round-robin scheme.

Synchronization Control Bit field (DSYN[4:0]) bits specify the event which can initiate the DMA transfer for the corresponding DMA channel. The 5-bit field of DSYN[4:0] allows many synchronization options. Megacell 100 has six external interrupts, two timer interrupts, and four input events for each of the three peripherals. Other embodiments of the present invention may have different event synchronization options. The DSYN[4:0] field is set to zero upon reset. When zero, no event synchronization is provided.

FIG. 10 illustrates DMA Channel Control Register 2 (DMCCR2) which is a read/write register that provides control for channel DMA to CPU 200 interrupt triggering. A DMA Channel Interrupt to CPU can be triggered when: a transfer block is completed, AND/OR a frame is completed, AND/OR $1^{st}$ half of a frame is completed, AND/OR the last frame of a block is starting, AND/OR an event synchronization dropped occurred. Every combination of these five different conditions can be chosen to trigger the DMA Channel interrupt to CPU.

The AUTOINIT bit specifies the auto-initialization mode which the DMA can automatically reinitialize itself after completion of a block transfer. Each channel context is defined by a set of Active Registers and a set of Init/Reload Registers. Only the Init/Reload registers are visible to the user. The Active registers are not mapped into the IO memory space. At the start of a block transfer, the set of Init/Reload registers is automatically copied to the set of active registers, and the transfer starts. At the end of a block, if Auto-init=0, then the channel transfers are stopped. If Auto-init=1, then the set of channel init/reload registers is copied to the set of channel active registers, next transfer block is started with the settings defined by this new set.

For continuous operation, CPU 200 may change the Init/Reload Registers while a current block is executed. A next block is transferred with new context but without stopping the DMA. For repetitive operation, CPU 200 does not modify the Init/Reload Registers. The same context is always re-used. By default, the set of Init/Reload Registers is initialized to the set of Active Registers. In the present embodiment, a reload takes four cycles for a reload during continuous operation.

Still referring to FIG. 10, a Channel status clear bit (CLEAR STATUS) bit is used to clear the channel status bits (in DMSTAT register). DMSTAT is read only, and can be reset only through this bit. CLEAR STATUS automatically returns to zero once DMSTAT is cleared.

FIG. 11 illustrates the DMA channel status register (DMSTAT). The DMSTAT is a read register that provides status on channel DMA to CPU interrupt triggering. The SYNC STATUS bit indicates that channel synchronization has been received.

Several status bits are available to inform the CPU of significant events or potential problems in DMA channel operation. These statuses reside in the 'STAT' bit fields of the DMA Status register. Such events can be used to trigger DMA to CPU interrupt for the corresponding channel by setting the Interrupt Enable 'IE' bit field in the DMCCR2 register. A status bit is updated only if its corresponding IE bit is set. The logical OR of all enabled conditions (except timeout) forms the DMA Channel interrupt signal to the CPU. If the timeout IE bit is set, and a timeout/bus error occurs, a timeout/bus error signal is sent to the CPU.

After a status bit is read, it must be then cleared by the CPU. The clear is performed by writing 1 in the CLEAR STATUS bit of DMCCR2n register. Table 11 has a description of each available status/condition.

TABLE 11

Status Bits

| Bit Field | Event | If IE ENABLED | If IE DISABLED |
|---|---|---|---|
| BLOCK | Block Transfer complete | CPU can read STAT register. CLEAR STATUS bit is used to clear STAT register. | The status bits aren't updated when the event occurs. No acknowledge is needed. |
| FRAME | Frame Transfer complete | | |
| 1stHALF | 1st Half of frame complete | | |
| LAST FRAME | Last Frame starts | | |
| TIME OUT | Timeout or bus error | | |
| SYNC DROP | Dropped Event Synchronization (subsequent synchronization events occurs before the last one is processed) | | |

FIG. 12 illustrates a DMA main data page register, DMMDPn. The address space of CPU 200 is 23 bits words addressable. For memory access, an address is split into a Main Data Page having 7 MSB of the 23 bits address and an Address in Page having 16 LSB of the 23 bits address.

MDP_SRC is used for memory access as transfer source. MDP_DST is used for memory access as transfer destination. This register is not initialized upon reset. This register can be written during a DMA transfer. When end of block is reached, if autoinit is set, DMMDPn is moved to its shadow register.

FIG. 13 illustrates a DMA source address register, DMSRCn. DMSRCn is a 16-bit read/write register that contains the source address for the next DMA transfer. This register is not initialized upon reset. This register can be written during a DMA transfer. When end of block is reached, if autoinit is set, DMSRCn is moved to its shadow register. If source is internal or external memory, these 16 bits address are concatenated with the 7 bits of MDP_SRC stored in DMMDPn.

FIG. 14 illustrates a DMA destination address register, DMDSTn. DMDSTn is a 16-bit read/write register which contains the destination address for the next DMA transfer. This register is not initialized upon reset. This register can be written during a DMA transfer. When end of block is reached, if autoinit is set, DMDSTn is moved to its shadow register. If destination is internal or external memory, these 16 bits address are concatenated with the 7 bits of MDP_DST stored in DMMDPn.

When source and/or destination space is memory, several address generation schemes exist: constant addressing, post increment, single indexed post increment (element index), and multi indexed post increment (element index & frame index).

Circular addressing is implicit when auto-init mode is chosen for the channel. For single indexed post increment, one element index register is available per channel and can be used for indexed post increment of the current channel. For multi indexed post increment, in addition to the element index register, one frame index register is available per channel. This allows flexible sorting of multi-frame transfers.

FIG. 15 illustrates a DMA element count register, DMECn. The DMA Element Count Register is a 16-bit read/write register that contains the number of elements per frame in the channel transfer block. This 16-bit register allows specification of the 16-bit unsigned count value. The number of elements to transfer can be set between 1 and 65535. This register is not initialized upon reset. This register can be written during a DMA transfer. When end of block is reached, if autoinit is set, DMECn is moved to its shadow register.

FIG. 16 illustrates a DMA frame count register, DMFCn. The DMA Channel Frame Count Register is a 16-bit read/write register that contains the total number of frames. Frame Count can be set from 1 to 65535. This register is not initialized upon reset. This register can be written during a DMA transfer. When end of block is reached, if autoinit is set, DMFCn is moved to its shadow register.

FIG. 17 illustrates a DMA element index register, DMEIDXn. The DMA Element Index Address Register is a 16-bit read/write register. The Index Register values are used as the element index for source/destination address updates. The values in DMEIDXn are considered as signed 16-bit value. The index range is from −32768 to 32767. DMEIDXn is not initialized upon reset. This register can be written during a DMA transfer. When end of block is reached, if autoinit is set, DMEIDXn is moved to its shadow register.

FIG. 18 illustrates a DMA element frame index address register, DMFIDXn. The DMA Frame Index Register is a 16-bit read/write register. The Frame Index Register values are used as the frame index for source/destination address updates. The values in the DMFRI0/1 are considered as signed 16-bit value. The index range is from −32768 to 32767. DMFIDXn is not initialized upon reset. This register can be written during a DMA transfer. When end of block is reached, if autoinit is set, DMFIDXn is moved to its shadow register.

Ports

Referring again to FIG. 2, ports 212(a–d) are each connected to a specific memory resource. Each port is tailored to support interactions with the resource to which it is connected. The following paragraphs describe the various ports in more detail.

RHEA port 212d handless the communication protocol between DMA controller 210 and RHEA bridge 230. The protocol is driven by a state machine. This state machine is described in Table 12.

TABLE 12

Finite State Machine for RHEA Port inputs of the fsm

| | |
|---|---|
| irq | interleaver request, sirqs = shadow interleaver request; the request comes from the interleaver and asks the RHEA bridge for a transfer. The type of transfer (read or write) is defined in the op (operation) register. irq is the request served in normal flow, sirq is the request served after a port stall in the pipeline. |
| rdy | gl_readyrhea_nf, acknowledge signal returned by the RHEA bridge |
| a | abort; abort is computed from the bus error signal, gl_buserrorrhea_nf, coming from the RHEA bridge, the enable bit of the channel and the event_drop signal. When this signal is active, the request currently processed by the port must be aborted by putting high the request signal (dma_reqrhea_nr). | outputs of the fsm

| | |
|---|---|
| ps | port stall. When the RHEA bridge doesn't acknowledge a request, this signal is equal to one. The port state machine stops all the pipeline after a port stall is detected. |
| req | dma_reqrhea_nr, request sent to the RHEA bridge. |

When an abort (buserror/timeout, event_drop or invalidation of a channel) occurs, the state machine goes in the abort state to make the req signal inactive. The RHEA bridge always sends its bus_error signal with a ready.

SARAM port 212a and DARAM port 212b handle the communication protocol between the DMA and SARAM wrapper 220 and DARAM wrapper 230, respectively. The wrapper includes memory circuitry and access/control circuitry for accessing the memory circuitry. These wrappers have the same access protocol. When HPI 214 has a high priority level, HPI requests have priority over the interleaver 350/351 requests; therefore, the interleaver requests are taken in account only if there are no HPI high priority requests. The protocol for each port is driven by a state machine. These state machines is described in Table 13.

TABLE 13

SARAM, DARAM State Machine inputs of the fsm

| | |
|---|---|
| irq | interleaver request, sirqs = shadow interleaver request; the request comes from the interleaver and asks the SARAM/DARAM port for a transfer. The type of transfer (read or write) is defined in the op (operation) register. irq is the request served in normal flow, sirq is the request served after a port stall in the pipeline. |
| arq | HPI request. |
| rdy | gl_readysaram_nr or gl_readydaram_nr, acknowledge signal returned by the SARAM/DARAM wrappers. |
| a | abort; abort is computed from the timeout indicator coming from the timeout counter, the enable bit of the channel and the event_drop signal. When this signal is active, the request currently processed by the port must be aborted by putting high the request signal. | outputs of the fsm

| | |
|---|---|
| ps | port stall. When the SARAM/DARAM wrapper doesn't acknowledge a request, this signal is equal to one. The port state machine stops all the pipeline after a port stall is detected. |
| req | dma_reqsaram_nr or dma_reqdaram_nr, request sent to the wrappers. |
| t_on | timeout counter on: enables the timeout counter. |
| t_start | timeout counter start: start the timeout counter. Each time this command is active, the timeout counter restarts from zero. |

When an abort (timeout, event_drop or invalidation of a channel) occurs, the state machine goes in the wait initial state to make the req signal inactive. To monitor timeouts, a counter is started every time a new request is sent. If this counter value reaches a threshold, a timeout is signaled; the current request is aborted and all the channel transfers are stopped.

EMIF port 212c handles the communication protocol between DMA controller 210 and External Memory Interface 120. It receives requests from EMIF interleaver 352. Burst accesses are made on the same scheme as for word accesses. All the addresses are output, even if only the first one is needed. The only difference is the value of the burst code. The protocol is driven by a state machine. This state machine is described in Table 14.

TABLE 14

EMIF Port Finite State Machine inputs of the fsm

| | |
|---|---|
| ir | interleaver request, sirq = shadow interleaver request; the request comes from the interleaver and asks the EMIF port for a transfer. The type of transfer (read or write) is defined in the op (operation) register. irq is the request served in normal flow, sirq is the request served after a port stall in the pipeline. Both are active high. |
| rdy | gl_readyemif_nf, acknowledge signal returned by the EMIF, active high. |
| a | abort signal, computed from the EMIF bus error input (gl_buserroremif_nf), the event drop signal and the enable bit of the active channel. It is active high. |
| same_req | this input, used only when abort is active, is active high if the request at the interleaver stage is of the same type (same channel, same operation) as the request in the port_req2 register. same_req is used to decide if the request following an abort should be launched (if same_req = 0) or not (if same_req = 1). |
| reset | global DMA reset. | outputs of the fsm

| | |
|---|---|
| ps | port stall. When the EMIF doesn't acknowledge an request, this signal is equal to one. A port stall stops all the pipeline. |
| req | dma_reqemif_nr request sent to the emif. |
| req_aborted | active high when a request is aborted. |

The EMIF port state machine has 7 states:
wait: waiting for a request,
req1: sending of the first request,
req2: sending of the second request,
wait2: waiting of the ready bound to the first request,
wait1: waiting of the ready bound to the second request,
abort2: abort of the first request
abort1: abort of the second request. In the abort1 state, neither ready nor abort can be active because abort1 is reached only from the abort2 state, where no request is sent.

In alternative embodiments of the present invention, other types of memory resources can be accommodated by other ports which are tailored to meet the protocol requirements of the associated memory resource. Advantageously, each tailored port provides the same interface to the DMA channel controllers, such as 310–315, for example, so that the channel controllers can communicate with these other tailored ports without being modified.

DMA pipeline

The DMA contains two concurrent pipelines: an address pipeline and an interleaver pipeline. In these pipelines, some stages are private to a channel, and some are shared between the channels. The interleaver pipeline is composed of two sets of stages: the read stages (R prefix) and the write stages (W prefix). A one word transfer will go through all of stages: the read stages for the read request, and the write stages for the write request.

Figure 19:
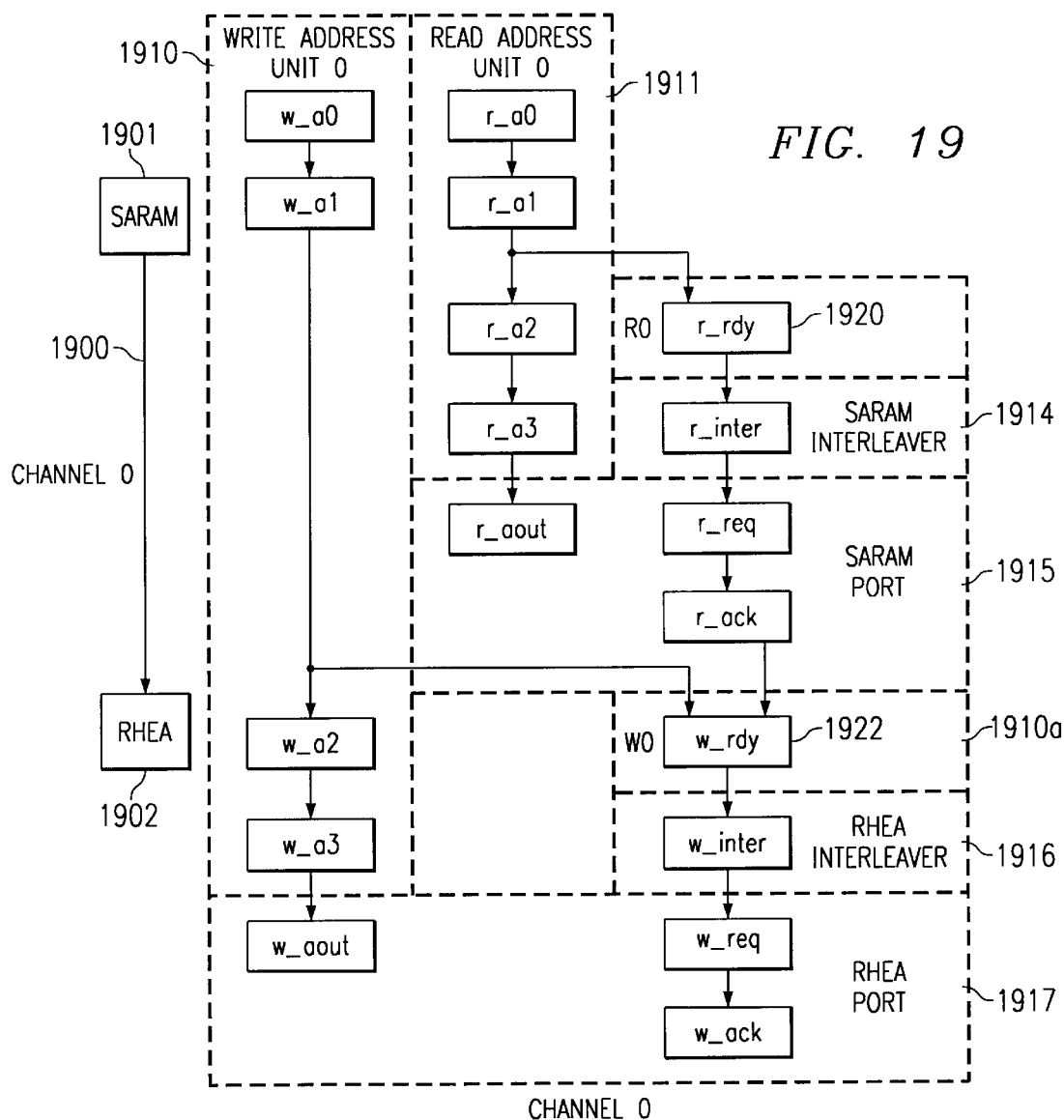
FIG. 19 is a flow chart illustrating the operation of the DMA controller.

FIG. 19 is a flow chart illustrating the operation of the DMA controller and denoting the various stages of the pipeline. Table 15 describes the stages.

TABLE 15

DMA Pipeline Stages

| | |
|---|---|
| R_A0, | read address unit output; at this stage, the end of element |
| R_A1, | and end of transfer signal are computed. |
| R_A2 | real read address computation |
| R_A3 | wait for interleaving of the read request |
| R_Aout | address output to the source memory/peripheral |
| R_RDY | computation of the active_read and read_ready signals in the source interleaver |
| R_INTER | interleaving (choice of the next request to serve in the source interleaver). |
| R_REQ | sending of the read request to memory/peripheral by the source port. |
| R_ACK | acknowledge of the read request and data delivery by the source memory/peripheral. |
| W_A0, | write address unit output; at this stage, the end of element |
| W_A1 | and end of transfer signal are computed. |
| W_A2 | real write address computation |
| W_A3 | wait for interleaving of the write request |
| W_Aout | address output to the destination memory/peripheral |
| W_RDY | computation of the active_write and write_ready signals in the destination interleaver |
| W_INTER | interleaving (choice of the next request to serve in the destination interleaver). |
| W_REQ | sending of the write request to memory/peripheral by the destination port. |
| W_ACK | acknowledge of the write request by the destination memory/peripheral. |

A source data word is retrieved from the designated source memory at the stage R_ACK. The source data word is accepted by the selected destination memory at the stage W_ACK. The source data word is stored in the channel FIFO between these two stages.

Each address pipeline is composed of five stages for the read address and five stages for the write address. This number of address stages is selected to correspond to the number of stages in the interleaver pipeline. Each address pipe stage matches a stage of the interleaving pipe. Latency of each DMA controller pipeline, assuming no memory wait states, is one cycle; that is, one data word is transferred every cycle. Delay, assuming no memory wait states is nine cycles. One transfer takes nine cycles. While there are ten stages in the DMA pipeline for each complete transfer from a source to a destination, but only nine clock cycles are needed to completely traverse the pipeline. The first address of a transfer is not computed, but directly loaded in address stage A1, bypassing address stage A0.

Some of the pipeline stages are private to each channel (one stage per channel); others are muxed between channels. Private interleaver stages are R_RDY, and W_RDY; private address stages are: R_A 0, R_A1, R_A2, W_A0, W_A1, W_A2. Shared interleaver stages are: R_INTER, R_REQ, R_ACK, W_INTER, W_REQ, W_ACK; shared address stages are: R_Aout, W_Aout.

Referring still to FIG. 19, this flow chart shows the sharing of the pipeline stages and the data flow for a DMA transfers 1900 in channel 0 from SARAM port 1901 to RHEA port 1902. At R_RDY stage 1920 the active_read and read-ready signals for channel 0 are asserted. At W_RDY stage 1922 the active_write and write_read signals for channel 0 are asserted.

Block 1910, 1910 a represents write address unit 0, while block 1911 represents read address unit 0. Block 1914 represents the interleaver circuitry for the SARAM port and block 1915 represents the port controller circuitry for the SARAM port. Block 1916 represents_the interleaver circuitry for the RHEA port and block 1917 represents the port controller circuitry for the RHEA port.

Stages R_INTER, R_REQ, R_ACK in the SARAM port use the same logic as the stages W_INTER, W_REQ, W_ACK of the SARAM port when it is a destination. These stages are in the SARAM interleaver and SARAM port. Multiplexers (not shown) receive read ready, read_active, write_ready and write_active signals from each channel.

Figure 20:
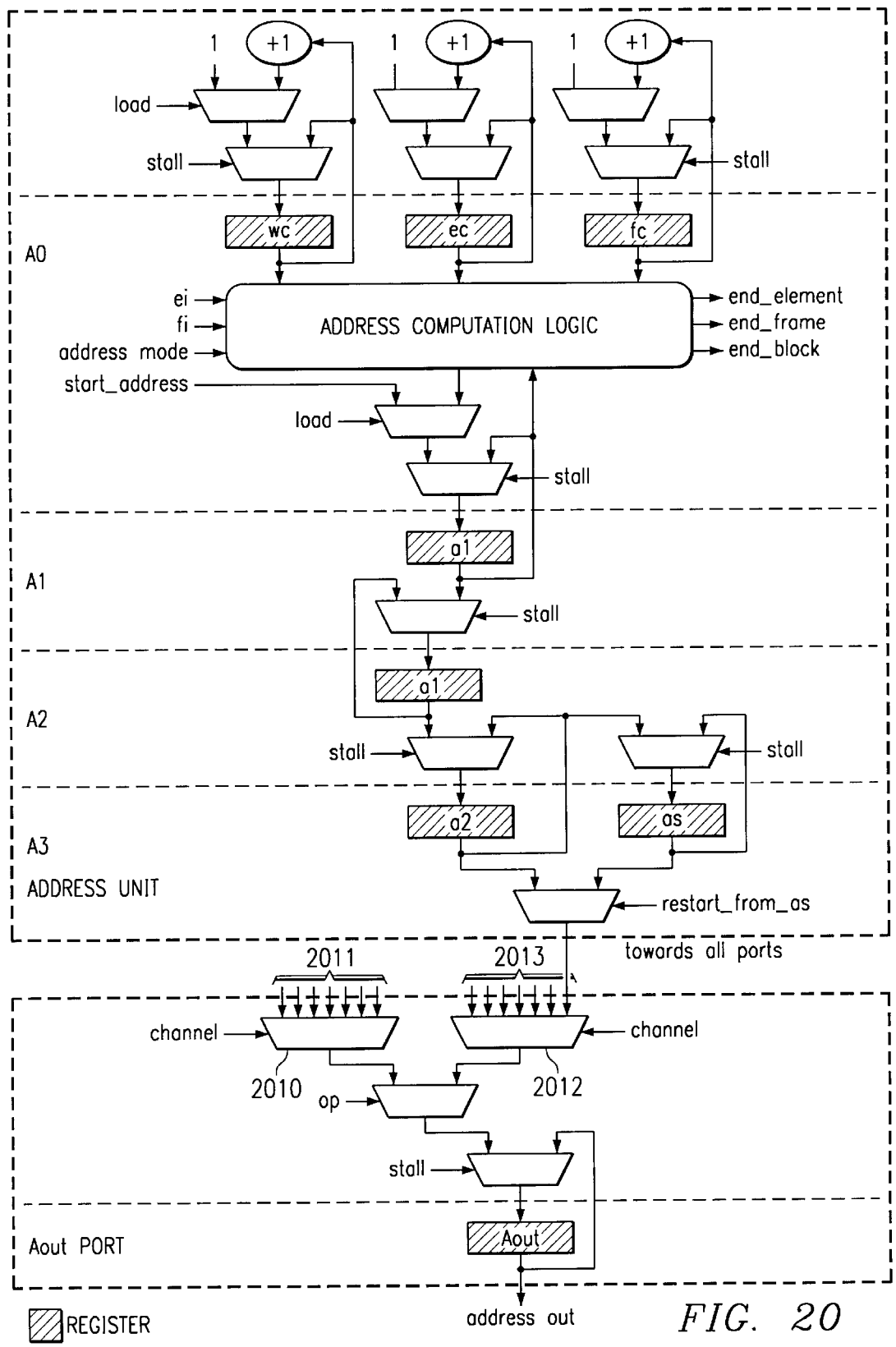
FIG. 20 is a block diagram of an address pipeline of the DMA controller.

FIG. 20 is a block diagram of an address pipeline of the DMA controller of digital system 10. This pipe has the same structure for both read and write addresses, and for all channels. Stages A0, A1, A2 and A 3 are instantiated 12 times in the DMA (6 channels, read and write requests for each channel). Stage Aout is present in each DMA port.

The channel address output of stage A 3 is sent to each DMA port. Mux 2010 receives read channel address buses 2011 from all of the channels, while mux 2012 receives write channel address busses 2013 from all of the channels. These muxes represent a portion of muxes 330–333 in FIG. 3. The muxing is performed according to the request processed at stage REQ of the corresponding interleaver pipe stage.

Figure 21A:
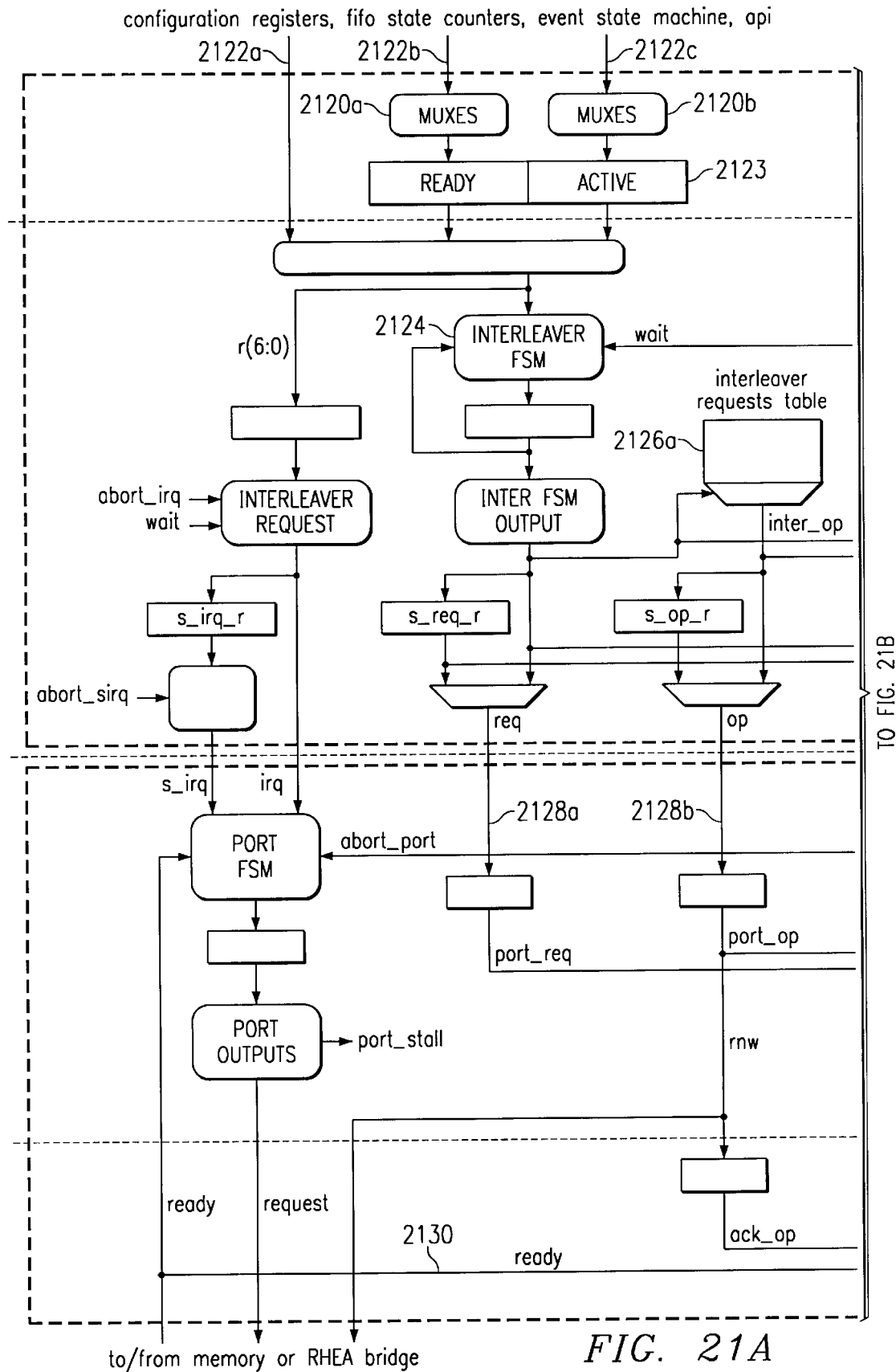
FIG. 21 is a block diagram of an interleaver/port pipeline of the DMA controller.
Figure 21B:
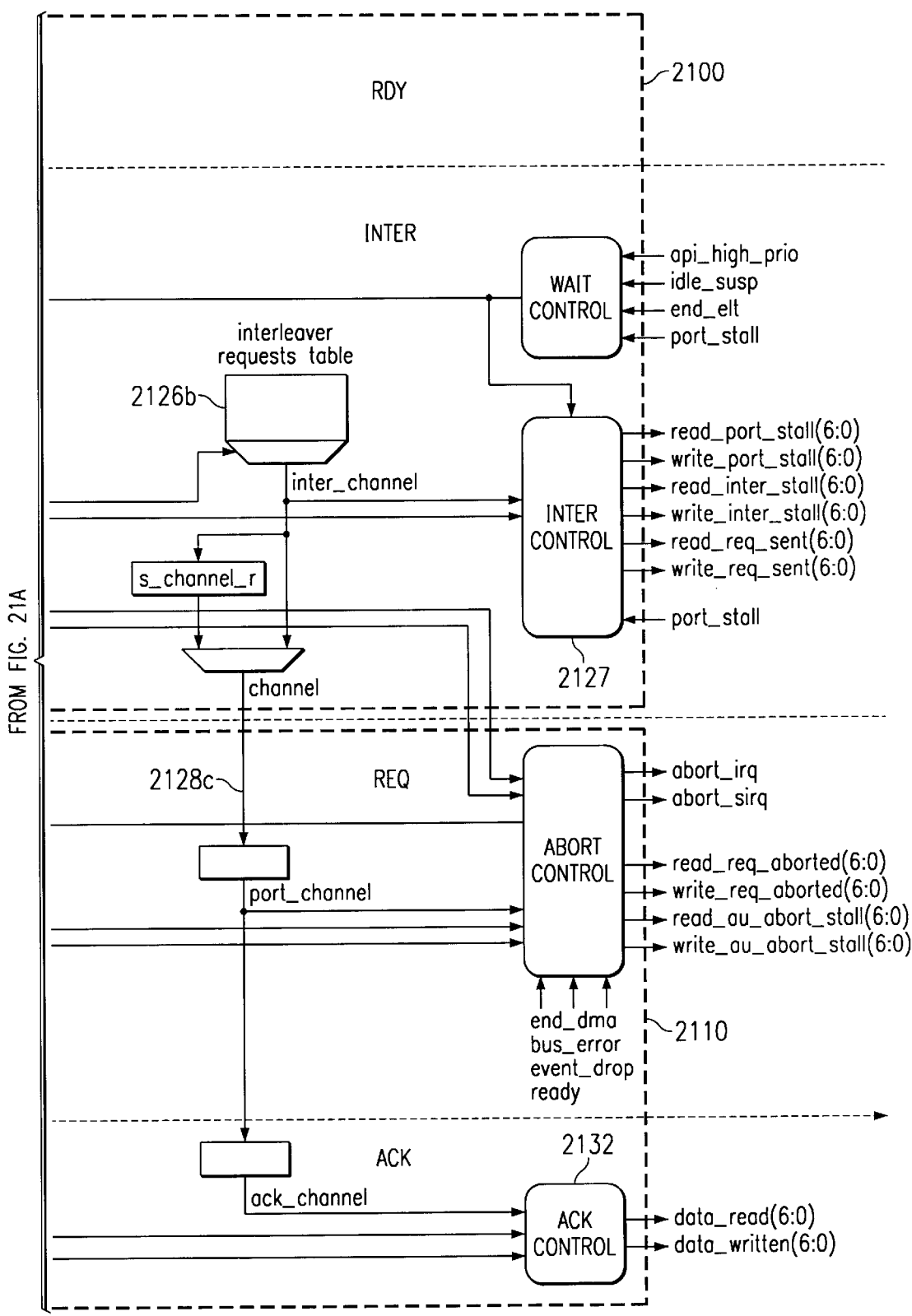

FIG. 21 is a block diagram of an interleaver/port pipeline of the DMA controller of digital system 10. Block 2100 contains the two interleaver stages, RDY and INTER. Block 2110 contains the two port stages REQ and ACK. Muxes 2120a and 2120b receive signals 2122a–c from the configuration registers, FIFO state counters, an event state machine and the HPI and provide them to ready and active circuitry 2123 to form ready and active signals, respectively, from all of the address units. The ready and active signals are provided to interleaver finite state machine 2124 which selects the request that will be processed next by the associated port. Interleaver request tables 2126a and 2126b store pending operation type and channel, respectively. A selected request, along with type of operation (read, write) and selected channel are provided on signal lines 2128a–c, respectively to the REQ stage of port control circuitry 2110. At the same time, a request signal is sent by interleaver control circuitry 2117 to mux 2010 or 2012 to select the appropriate channel address in response to the transfer scheduled by the interleaver. The selected address is then sent from the A_out stage to the memory resource associated with the port. A ready signal 2130 is asserted by the associated memory or RHEA bridge to indicate that a requested data word has been read and is available or has been written.

FIG. 22 is a timing diagram illustrating a transfer of six words from the SARAM port to the RHEA port which is representative of a typical transfer between any pair of ports in digital system 10, such as illustrated in FIG. 19. In this figure, for the channel FIFO write counter command w_com, "+" means increment and "-" means decrement. Signal nw_cnt indicates the channel FIFO write counter next state. Likewise, for the channel FIFO read counter command r_com, "+" means increment and "-" means decrement. The signal nr_cnt indicates the channel FIFO read counter next state.

TABLE 16

Notation for FIG. 22

| | |
|---|---|
| ai | data number i of channel a. |
| is | interleaver stall |
| ps | port stall |
| ips | interleaver and port stalls |

TABLE 16-continued

Notation for FIG. 22

| | |
|---|---|
| e | end block (end transfer) |
| A | abort |

Referring still to FIG. 22, a transfer of six words from SARAM to RHEA in one channel, called a, is illustrated.

The pipeline starts at time t0 with the load of the initial addresses in the r_al and w_al registers and the initial word, element and frame counters value (stage r_a0, w_a0). From these values, end_element, end_block and end_frame signals are computed. As end_block isn't reached, read_ready (r_rdy stage) transitions to 1, allowing the first request a0 to be interleaved (r_inter stage) at time t2 and issued (r_req stage) at time t3.

In the same time, the write addresses propagate in the write addresses pipeline. As there are still no data in the FIFO, write_ready stays at 0 (w_rdy stage), and no requests of channel a are interleaved at stage w_inter. This produces an interleaver stall to the write addresses pipeline to stop the write addresses propagation.

Data are read from the memory and written in the FIFO at time t5. Once the next state of FIFO_read_counter is 1 at time t4, write_ready goes high at time t5 and the interleaving of channel a write requests starts at time t6.

When the last read address of the six word block is reached in stage r_a0 at time t4, end_block is signaled (stage r_a0) at time t5. This makes read_ready go low at time t7 (stage r_rdy), and the sending of read requests is finished at t8.

Once the last data word to write is transferred from the FIFO, the FIFO read counter goes to 0 at time t11. This, and the end_block signaled by the w_a0 stage makes the write_ready signal be disasserted at time t11. The last write request interleaved, a6, is aborted and the six word transfer is complete at time t13.

When a request is sent in a channel, the FIFO state counters of this channel must be updated. This is done by interleaving control block 2127 sending the FIFO_write_ counter incrementation command (read_req_sent, w_com+) and the FIFO_read_counter decrementation command (write_req_sent, r_corn−) to the correct channel.

The current channel at the INTER stage is compared to each possible channel. An update command will be sent only in the channel which matches the current one. If the operation is a read, and if there is an interleaver request at the current stage (irq=1), the correct read_req_sent is activated. If the operation is a write, and if there is an interleaver request at the current stage (irq=1), the correct write_req_ sent is activated.

An interleaver stall is sent to all the address, end transfer and end element pipelines in all the channels that aren't currently active at the INTER stage. A signal write_inter_ stall is sent to the write part of these pipes, and a signal read_inter_stall is sent to the read part. Each pipe receives these commands simultaneously from the four ports. A pipe is stalled only if the four commands it receives are all active.

When a request is acknowledged in a channel, the FIFO state counters of this channel must be updated. This is done by the acknowledge control block 2132.

Figure 23:
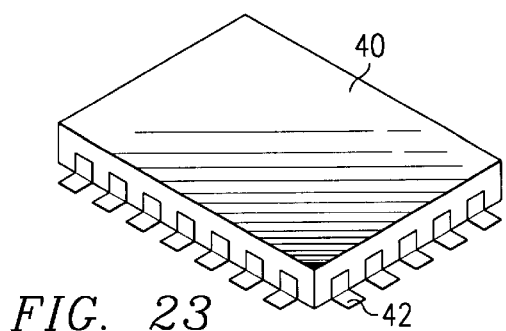
FIG. 23 is a schematic representation of an integrated circuit incorporating the digital system of FIG. 1.

FIG. 23 is a schematic representation of an integrated circuit 40 incorporating processor 100. As shown, the integrated circuit includes a plurality of contacts for surface mounting. However, the integrated circuit could include other configurations, for example a plurality of pins on a lower surface of the circuit for mounting in a zero insertion force socket, or indeed any other suitable configuration.

Figure 24:
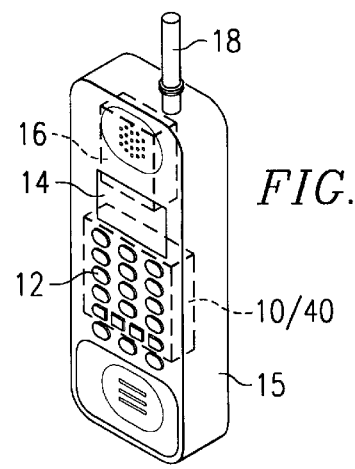
FIG. 24 illustrates an exemplary implementation of an example of such an integrated circuit in a mobile telecommunications device, such as a mobile telephone.

FIG. 24 illustrates an exemplary implementation of an example of such an integrated circuit in a mobile telecommunications device, such as a mobile telephone with integrated keyboard 12 and display 14. As shown in FIG. 24, the digital system 10 included in integrated circuit 40 is connected to the keyboard 12, where appropriate via a keyboard adapter (not shown), to the display 14, where appropriate via a display adapter (not shown) and to radio frequency (RF) circuitry 16. The RF circuitry 16 is connected to an aerial 18.

Referring again to FIG. 4, in an alternative embodiment, ports may be tailored to provide an access protocol required by a different type of resource. Advantageously, channel and scheduling circuitry can interact with various versions of tailored ports without being modified since the channel interface on the port control circuit is the same for all ports. A design library can be provided with a design cell representative of DMA channel controller 400a that is parameterized so that the number of channels to be instantiated in a given ASIC design can be specified. The design library can be provided with design cells for various port controllers that each provide a standard channel interface compatible with interface 470 and that have various memory interfaces. Other port controller cells can be tailored to meet the protocol requirements of a different type of memory resource. The DMA channel controller cell does not need to be modified to interface with the tailored port controllers since the channel interfaces are all compatible.

Fabrication of digital system 10 involves multiple steps of implanting various amounts of impurities into a semiconductor substrate and diffusing the impurities to selected depths within the substrate to form transistor devices. Masks are formed to control the placement of the impurities. Multiple layers of conductive material and insulative material are deposited and etched to interconnect the various devices. These steps are performed in a clean room environment.

A significant portion of the cost of producing the data processing device involves testing. While in wafer form, individual devices are biased to an operational state and probe tested for basic operational functionality. The wafer is then separated into individual dice which may be sold as bare die or packaged. After packaging, finished parts are biased into an operational state and tested for operational functionality.

Digital system 10 contains hardware extensions for advanced debugging features. These assist in the development of an application system. Since these capabilities are part of the core of CPU 200 itself, they are available utilizing only the JTAG interface with extended operating mode extensions. They provide simple, inexpensive, and speed independent access to the core for sophisticated debugging and economical system development, without requiring the costly cabling and access to processor pins required by traditional emulator systems or intruding on system resources.

Thus, a digital system is provided with a multi-channel DMA controller for transferring data between various resources. Parallel channel to port buses are provided for read addresses, write addresses and data outputs from each channel to each port. Parallel port to channel buses are provided for data inputs from each port to each channel. Scheduling circuitry includes request allocator circuitry, interleaver circuitry and mux circuitry and selects one of the channel to port buses to be connected to an associated port controller on each clock cycle for providing an address for a transaction performed on each clock cycle. The schedulers operate in parallel and source/destination channel address words are transferred in parallel to each scheduler via the parallel channel to port buses. Input/output data words are also transferred in parallel to/from each port. Each port is tailored to provide an access protocol required by its associated resource.

Performance is optimized by the provision of multiple parallel buses so that all of the ports can read or write data from an associated memory resource on the same clock cycle. A new transfer address, which may be either a read address or a write address, can be sent to each port on each clock cycle so that all of the ports can transfer separate streams of data in parallel.

The ports may be tailored in different embodiments to provide an access protocol required by a different type of resource. Channel and scheduling circuitry within a subportion of the DMA controller can interact with various versions of tailored ports without being modified.

As used herein, the terms "applied," "connected," and "connection" mean electrically connected, including where additional elements may be in the electrical connection path. "Associated" means a controlling relationship, such as a memory resource that is controlled by an associated port.

While the invention has been described with reference to illustrative embodiments, this description is not intended to be construed in a limiting sense. Various other embodiments of the invention will be apparent to persons skilled in the art upon reference to this description. For example, a different number of channel controllers and/or ports may be implemented. Different types of memory resources may be associated with a port by tailoring the port to match the memory resource.

It is therefore contemplated that the appended claims will cover any such modifications of the embodiments as fall within the true scope and spirit of the invention.

What is claimed is:

1. A digital system with a multi-channel direct memory access (DMA) controller, wherein the DMA controller comprises:
   a plurality of channel circuits each having at least one channel address output node for providing a channel address and at least one request output; and
   a plurality of port circuits each having a plurality of channel address input nodes connected to a respective channel address output node of the plurality of channel circuits, each port circuit of the plurality of port circuits having a memory address output node for providing a memory address selected from the plurality of address input nodes to a respective associated memory resource; and
   wherein each port circuit further comprises a scheduler circuit connected to the request outputs on the plurality of channel circuits, the scheduler circuit operable to select the next request that will be served by the port, such that the plurality of port circuits are operable to access the respective associated memory resources simultaneously; and
   wherein each port circuit further comprises a port control circuit having a channel interface node connected to the respective scheduling circuit to receive a selected channel address and a memory interface node for providing the memory address and an access protocol to the respective associated memory source, such that all of the plurality of port control circuits have identical channel interface nodes.

2. The digital system according to claim 1, wherein the schedul circuit comprises a plurality of scheduling circuits, such that a separate scheduling circuit is associated with each port circuit.

3. The digital system according to claim 1, wherein each channel circuit comprises a FIFO buffer and wherein at least one of the port circuits is operable to perform a burst transfer of data between the FIFO buffer of a selected channel circuit and the memory resource associated with the at least one port circuit.

4. The digital system according to claim 1, wherein each channel further comprises address circuitry connected to the channel address output node, each address circuit operable to perform multi-indexed address computation.

5. The digital system according to claim 1, wherein each channel circuit further comprises a read address circuit having a first channel address output node and a write channel address circuit having a separate second channel address output node.

6. The digital system according to claim 1, wherein there is a separate bus connected from each channel address output node to the respective channel address input nodes of the plurality of port circuits.

7. The digital system according to claim 1 wherein each port control circuit is operable to provide an interface protocol responsive to the associated memory resource, such that a first port control circuit provides a first interface protocol and a second port control circuit provides a second interface protocol, such that the first interface protocol is different from the second interface protocol.

8. A digital system with a multi-channel direct memory access (DMA) controller, wherein the DMA controller comprises:
   a plurality of channel circuits, wherein each channel circuit comprises a read address circuit having a first channel address output node and a write channel address circuit having a separate second channel address output node for providing a read request output and a write request output;
   a plurality of port circuits each having a plurality of channel read address input nodes connected to a respective channel read address output node of the plurality of channel circuits, each port circuit having a plurality of channel write address input nodes connected to a respective channel write address output node of the plurality of channel circuits, each port circuit having a memory address output node for providing a memory address selected from the plurality of address input nodes to a respective associated memory resource; and
   wherein each port circuit further comprises a scheduler circuit connected to the read request outputs and the write request outputs on the plurality of channel circuits, the scheduler circuit operable to select the next request that will be served by the port, such that the plurality of port circuits are operable to access the respective associated memory resources simultaneously.

9. The digital system according to claim 8, wherein the scheduler circuit comprises a plurality of scheduling circuits, such that a separate scheduling circuit is associated with each port circuit.

10. The digital system according to claim 8, wherein each channel circuit comprises a FIFO buffer and wherein at least one of the port circuits is operable to perform a burst transfer of data between the FIFO buffer of a selected channel circuit and the memory resource associated with the at least one port circuit.

11. The digital system according to claim 8, wherein each channel further comprises address circuitry connected to the channel address output node, each address circuit operable to perform multi-indexed address computation.

12. The digital system according to claim 8, wherein there is a separate bus connected from each channel address output node to the respective channel address input nodes of the plurality of port circuits.

13. The digital system according to claim 8, wherein each port circuit further comprises a port control circuit having a channel interface node connected to the respective scheduling circuit to receive a selected channel address and a memory interface node for providing the memory address and an access protocol to the respective associated memory resource such that all of the plurality of port control circuits have identical channel interface nodes.

14. The digital system according to claim 13, wherein each port control circuit is operable to provide an interface protocol responsive to the associated memory resource, such that a first port control circuit provides a first interface protocol and a second port control circuit provides a second interface protocol, such that the first interface protocol is different from the second interface protocol.

15. The digital system according to claim 8 being a cellular telephone, further comprising:
  a microprocessor controllably connected to the multi-channel DMA controller;
  an integrated keyboard (12) connected to the microprocessor via a keyboard adapter;
  a display (14), connected to the microprocessor via a display adapter;
  radio frequency (RF) circuitry (16) connected to the microprocessor; and
  an aerial (18) connected to the RF circuitry.

16. A cellular telephone with a multi-channel direct memory access (DMA) controller, wherein the DMA controller comprises:
  a plurality of channel circuits each having at least one channel address output node for providing a channel address and at least one request output; and
  a plurality of port circuits each having a plurality of channel address input nodes connected to a respective channel address output node of the plurality of channel circuits, each port circuit of the plurality of port circuits having a memory address output node for providing a memory address selected from the plurality of address input nodes to a respective associated memory resource, wherein each port circuit further comprises a scheduler circuit connected to the request outputs on the plurality of channel circuits, the scheduler circuit operable to select the next request that will be served by the port, such that the plurality of port circuits are operable to access the respective associated memory resources simultaneously; and further comprising:
  a microprocessor controllably connected to the multi-channel DMA controller;
  an integrated keyboard (12) connected to the microprocessor via a keyboard adapter;
  a display (14), connected to the microprocessor via a display adapter;
  radio frequency (RF) circuitry (16) connected to the microprocessor; and
  an aerial (18) connected to the RF circuitry.

17. A method of operating a digital system comprising a microprocessor, wherein the microprocessor is connected to a multi-channel direct memory access circuit having a plurality of channel circuits and a plurality of port circuits each connected to a memory resource for transferring data words, comprising the steps of:
  generating a plurality of pending transfer requests with a respective plurality of transfer addresses simultaneously in the channel circuits;
  providing the plurality of pending transfer requests to each of the plurality of port circuits;
  scheduling each port individually by selecting a transfer request and a channel from among the pending transfer requests; and
  performing a data transfer between each port and the selected channel such that all of the plurality of ports transfer a respective requested data word on the same clock cycle.

18. A method of designing a multi-channel direct memory access (DMA) controller for a digital system, comprising the steps of:
  selecting a parameterized cell for a DMA channel controller from a design library and specifying a first number of channels to be instantiated for the DMA controller by an automated design system;
  selecting a second number of port cells from a design library and specifying a number of instantiations for each selected port cell to provide a plurality of ports for the DMA controller, wherein each selected port cell has a standard channel interface compatible with the DMA channel controller and wherein each selected port cell has a memory resource interface tailored for a selected type of memory resource; and
  associating a plurality of memory resources with the plurality of ports such that each of the plurality of memory resources is associated uniquely with a port having a memory resource interface compatible with the associated memory resource.

* * * * *